US005682218A

United States Patent [19]
Shimizu et al.

[11] Patent Number: 5,682,218
[45] Date of Patent: Oct. 28, 1997

[54] ELECTROOPTICAL DEVICE HAVING SPECIFIC POLYMERIZED COLUMNAR SPACERS AND METHOD FOR FORMING THE SAME

[75] Inventors: Michio Shimizu, Chiba; Toshimitsu Konuma, Kanagawa; Takeshi Nishi, Kanagawa; Kouji Moriya, Kanagawa, all of Japan

[73] Assignee: Semiconductor Energy Laboratory Co., Ltd., Kanagawa, Japan

[21] Appl. No.: 389,578

[22] Filed: Feb. 15, 1995

[30] Foreign Application Priority Data

Feb. 18, 1994 [JP] Japan ................................. 6-045255

[51] Int. Cl.[6] ........................ G02F 1/1339; G02F 1/1333
[52] U.S. Cl. ........................ 349/156; 349/86; 349/93
[58] Field of Search ............................ 359/81, 51, 52

[56] References Cited

U.S. PATENT DOCUMENTS

| | | | |
|---|---|---|---|
| 5,128,391 | 7/1992 | Shustack | 522/92 |
| 5,384,066 | 1/1995 | Poetsch et al. | 359/51 |
| 5,450,220 | 9/1995 | Onishi et al. | 359/51 |
| 5,490,001 | 2/1996 | Konuma | 359/51 |
| 5,499,128 | 3/1996 | Hasegawa et al. | 359/81 |

FOREIGN PATENT DOCUMENTS 6-160824  6/1994  Japan ................................. 359/51

*Primary Examiner*—William L. Sikes
*Assistant Examiner*—Charles Miller
*Attorney, Agent, or Firm*—Sixbey, Friedman, Leedom & Ferguson; Gerald J. Ferguson, Jr.; Karlton C. Butts

[57] ABSTRACT

In a liquid crystal cell, a distance between substrates is fixed to be prevented from increasing without adversely affecting an orientation of liquid crystal material. An adverse effect of undesired charge within a liquid crystal layer is removed to stabilize optical characteristics. A mixture of the liquid crystal material and non-cured resin (i.e., resin forming material and reaction starter) is injected between light-transmissive substrates which form the liquid cell. The non-cured resin is precipitated into the interior of the cell, and the liquid crystal material is orientated. Thereafter, the reaction starter is opened or torn so that the resin is cured to thereby bond the two substrates together with the resin in the form of columns. In this case, the undesired charge within the liquid crystal layer is canceled by the curing effect of the resin concomitant with the opening or tearing of the reaction starter.

24 Claims, 27 Drawing Sheets

Time

Dark

Bright

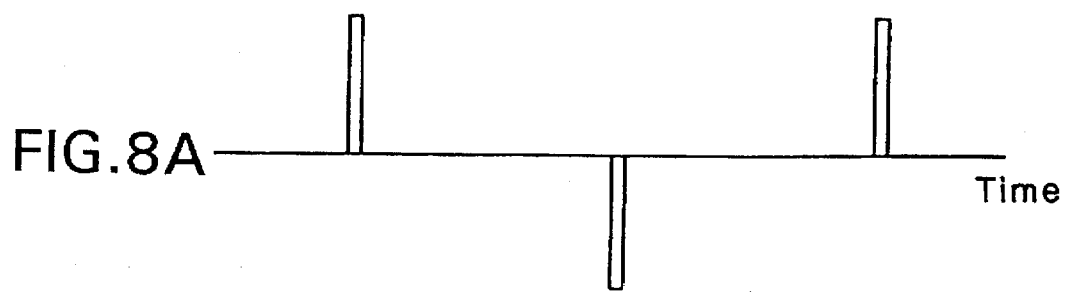
FIG.8A — Time
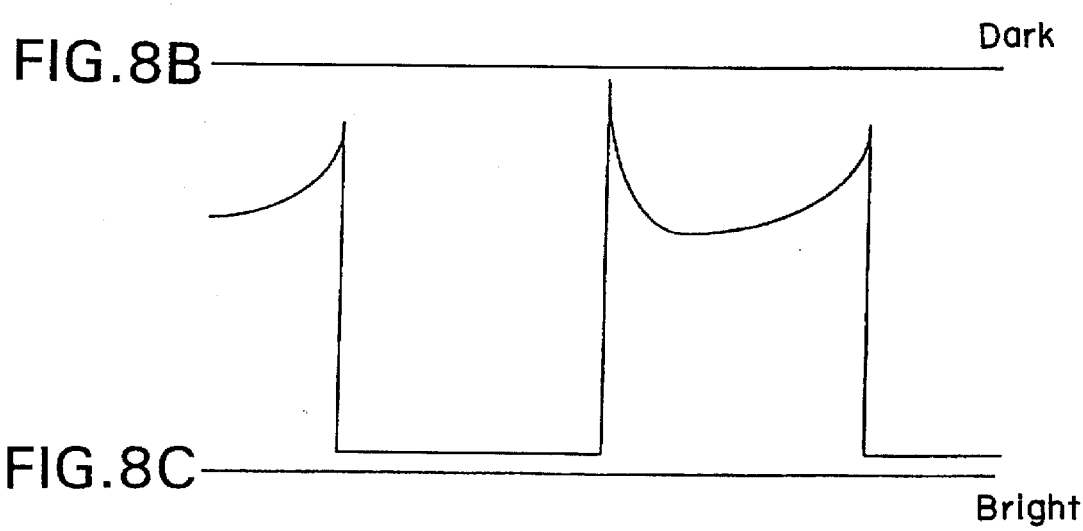
FIG.8B — Dark
FIG.8C — Bright

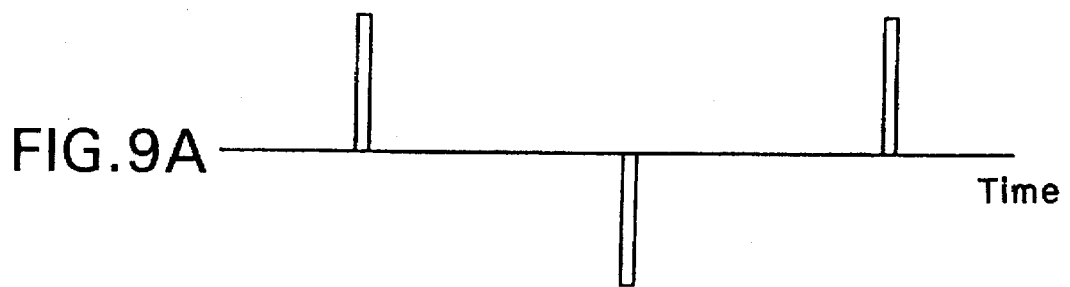
FIG.9A
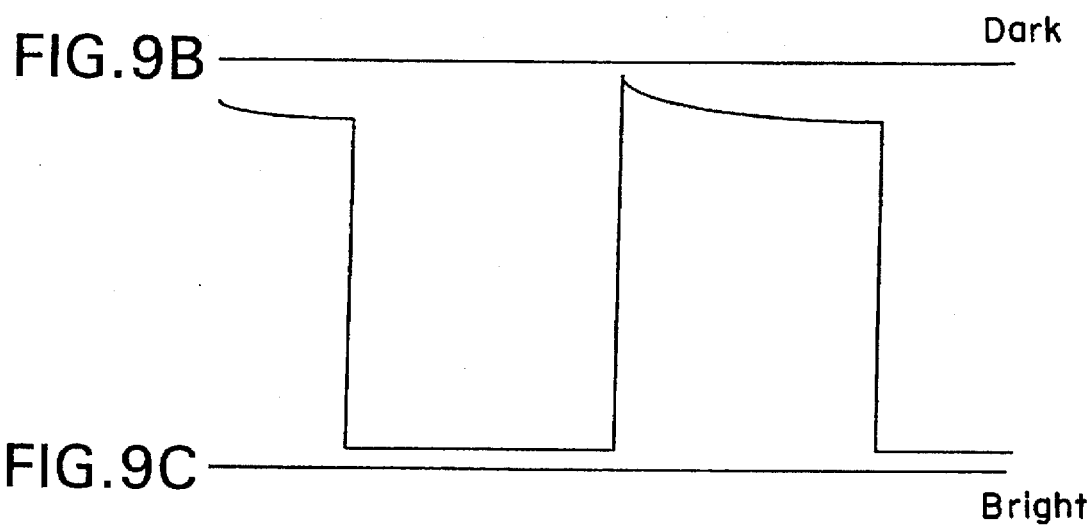
FIG.9B
FIG.9C

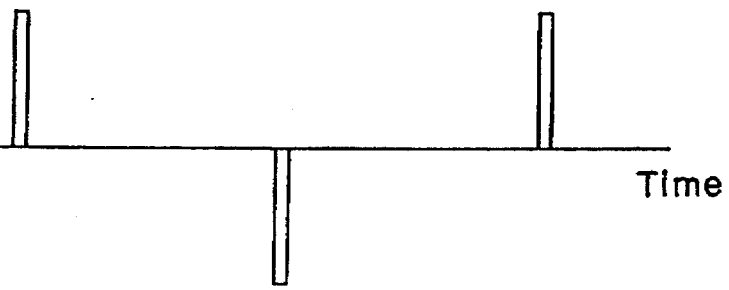
FIG.12A
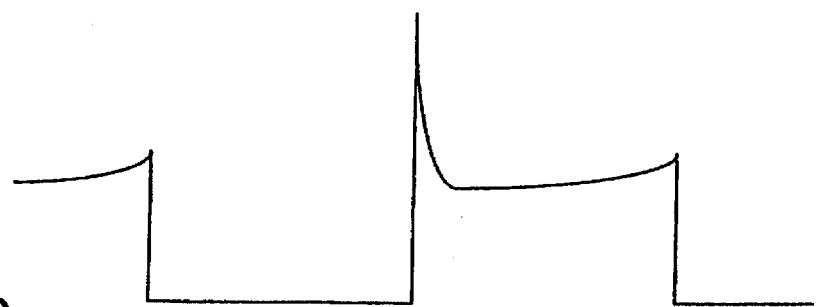
FIG.12B
FIG.12C

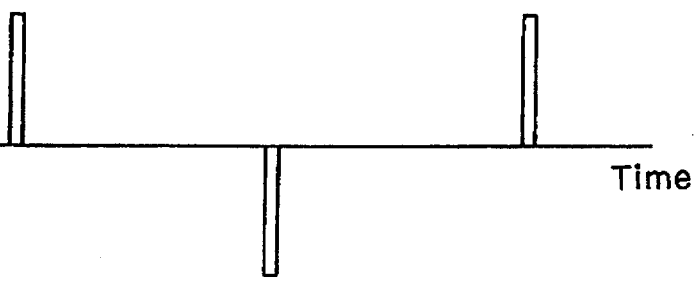
FIG.16A
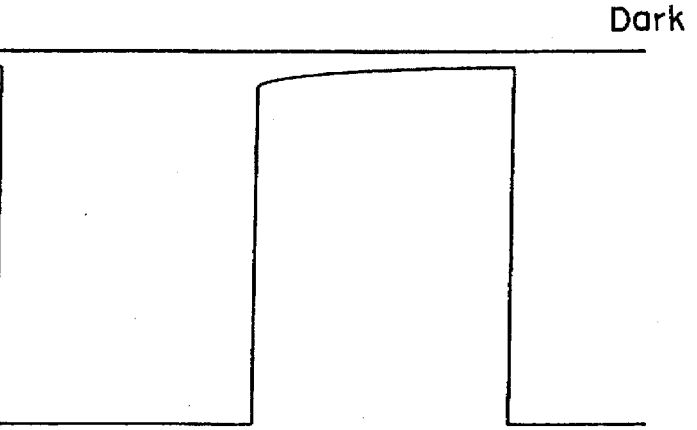
FIG.16B
FIG.16C

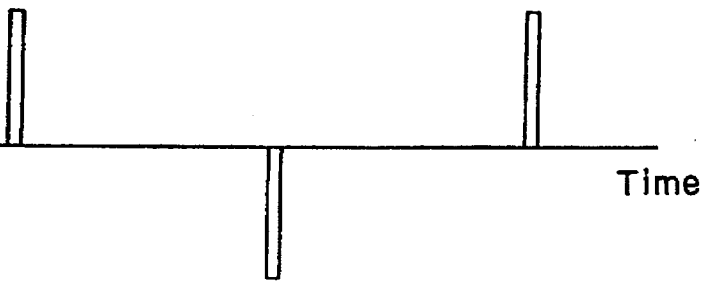
FIG.18A ─────────────────── Time
FIG.18B ─────────────────── Dark
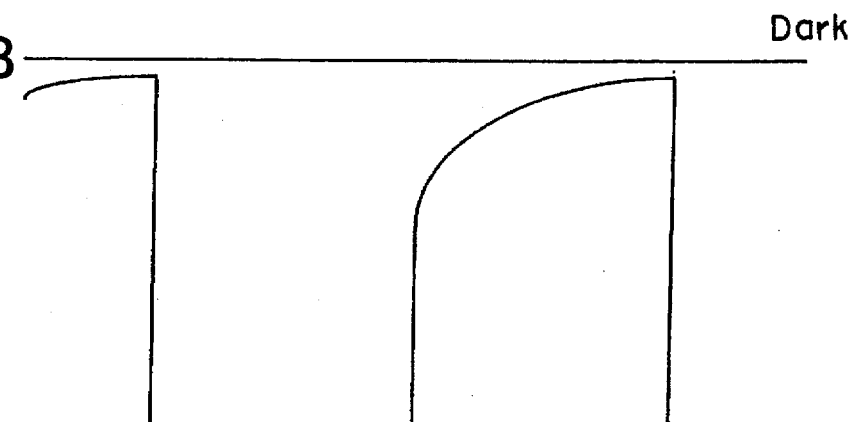
FIG.18C ─────────────────── Bright Time Dark Bright

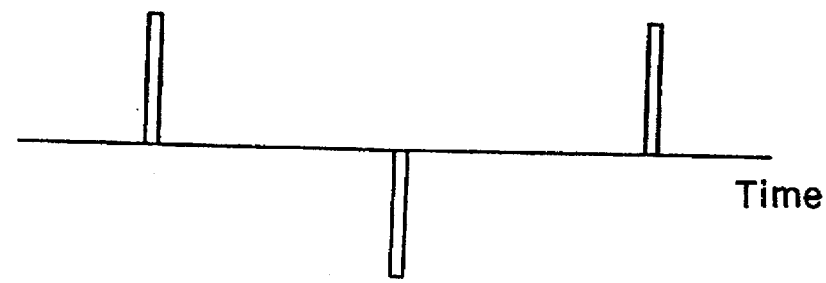
FIG. 25A
Time
FIG. 25B
Dark
FIG. 25C
Bright

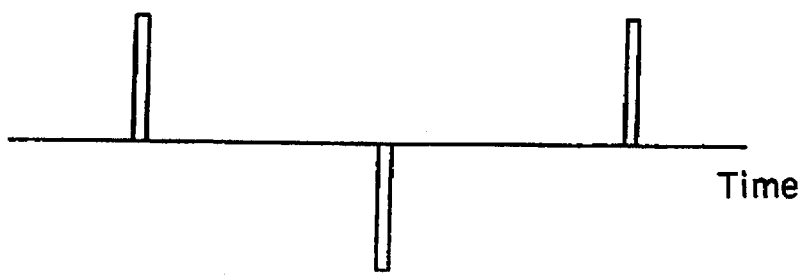
FIG.26A
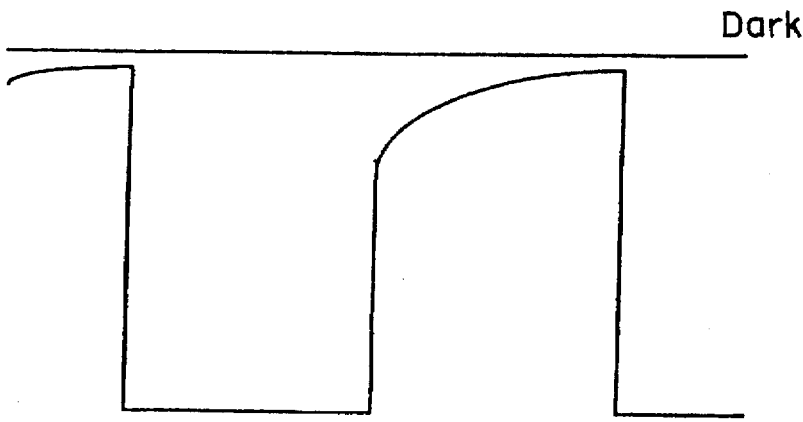
FIG.26B — Dark
FIG.26C — Bright

ELECTROOPTICAL DEVICE HAVING SPECIFIC POLYMERIZED COLUMNAR SPACERS AND METHOD FOR FORMING THE SAME

BACKGROUND OF THE INVENTION

The present invention relates to a structure of a birefringent type or a rotary polarization type liquid crystal electrooptical device and a method for producing the same.

The present invention also relates to a structure for keeping constant a substrate interval (i.e., substrate distance) of a liquid crystal electrooptical device, in particular, a large area liquid crystal electrooptical device and a method for producing the same.

The present invention also relates to a liquid crystal electrooptical device having resin in the form of a column which has been obtained by curing non-cured resin precipitated from liquid crystal material and a method for producing the same.

Of conventional liquid crystal electrooptical devices, TN type or STN type ones which use nematic liquid crystal or the like are well known in the art and have been used. Also, recently, devices having ferroelectric liquid crystal are well known. These liquid crystal electrooptical devices basically utilize the electrooptical effect in the following manner. Namely, a first substrate having an electrode and a second substrate having an electrode are arranged to face each other with electrode side surfaces thereof being directed inwardly; liquid crystal material is interposed between the first and second substrates; a voltage is applied to the liquid crystal layer by the electrodes on the substrates; a state of liquid crystal molecules is changed by anisotropy of a dielectric constant of the liquid crystal material per se or by, in case of the ferroelectric liquid crystal, spontaneous polarization; and as a result, the electrooptical effect is utilized in accordance with the change of the state of the liquid crystal molecules.

In the TN and STN type liquid crystal electrooptical devices, liquid crystal molecules are arranged in a rubbing direction in accordance with a restriction force of a rubbing process which has been carried out for orientation process on both substrate contact surfaces of the liquid crystal layer. In the upper and lower substrates, the rubbing directions are offset by 90° or in the range of 200° to 290°. In the middle of the liquid crystal layer, the liquid crystal molecules are arranged in a spiral manner so that an energy is the smallest between the upper and lower molecules located in the range of 90° to 290°. At this time, in case of the STN type device, a chiral material is mixed into the liquid crystal material if necessary.

In the above-described TN and STN type liquid crystal electrooptical devices, the liquid crystal molecules which have been arranged in a spiral manner are relocated in parallel with or perpendicular to a direction of electric field due to the dielectric anisotropy of the liquid crystal molecules by applying a voltage between both the substrates. The devices exhibit a bright condition in the case where such liquid crystal molecules are perpendicular to the surface of the substrates and a dark condition in the case where the liquid crystal molecules are parallel to the surface thereof. Also, since the state of the liquid crystal molecules is continuously changed by changing the voltage applied between the substrates, it is possible to display the gradation by suitably controlling the applied voltage.

In liquid crystal electrooptical devices having ferroelectric liquid crystal or antiferroelectric liquid crystal, the liquid crystal molecules are arranged in accordance with the restriction force of the rubbing process in at least one substrate surface. These liquid crystal molecules are arranged in a layer structure which is regularly laminated from one of the substrate surface to the other substrate surface.

In the above-described liquid crystal electrooptical devices having ferroelectric liquid crystal or antiferroelectric liquid crystal, the orientation of the spontaneous polarization possessed by the liquid crystal molecules themselves arranged in a layer structure parallel to the substrates is changed by 180° by applying a voltage between the two substrates (which will be hereinafter referred to as "reversal"). The devices perform a switching action from the bright condition to the dark condition or from the dark condition to the bright condition by changing, through a certain angle from the rubbing direction, the orientation of the liquid crystal molecules arranged in the rubbing direction by the reversal of the liquid crystal molecules.

Also, of these liquid crystal electrooptical devices, in a so-called active matrix type liquid crystal electrooptical device, an electrode of one of the substrates which clamp the liquid crystal material is divided into a plurality of pixel electrodes and switching elements such as diodes and thin film transistors (TFTs) are connected to respective pixels, higher quality displays such as a high speed, a high tone and a multi-Gradation are carried out.

A general cell structure of the above-described liquid crystal electrooptical device will now be described with reference to FIG. 1 which shows a simple matrix type device. Electrode patterns 1102 and 1103 are formed on light transmissive substrates 1100 and 1101 made of glass or resin, respectively. Orientation means 1104 and 1105 are formed on the electrodes for directing the liquid crystal in a constant orientation. A minimum electrode space distance is kept by spacers 1107 sprayed on the substrates, and the two substrates are fixed by sealant. A liquid crystal material 1106 is injected in between the substrates to form a liquid crystal layer.

In general, in the case where a polyimide film which has been subjected to the rubbing process is used as an orientation means, the liquid crystal molecules are held in a horizontal orientation arranged in one direction at a constant angle or in parallel with the substrate surfaces. Also, in case of silane coupling agent is used, the liquid crystal molecules take a vertical orientation perpendicular to the substrate surfaces. It depends upon the aimed operation mode whether the liquid crystal molecules are arranged in the horizontal orientation or in the vertical orientation.

Under this condition, the voltage is applied to the liquid crystal from the electrodes 1102 and 1103. The bright condition or the dark condition is exhibited in response to the electric field generated in the liquid crystal molecules. In order to perform a uniform display over the entire cell surface, it is necessary to keep the substrate space interval constant and hence to arrange the two substrates at a constant interval. In general, the substrate space distance is varied depending upon the operational mode, but it is necessary that the distance be in the range of 1.2 to 20 μm and its allowance be not greater than 0.05μ.

Recently, there is a strong demand to a larger area image field for such a liquid crystal electrooptical device, and great efforts have been made to realize a huge liquid crystal display up to 40 inches in diagonal size.

In this case, the image field becomes larger and larger in size, but the demanded substrate space distance is very small in the range of 1.2 to 20 μm as described above and its precision should be expressed by 0.05 μm or less.

In case of the above-described 40 inch diagonal size, the weight of a pair of confronting glass substrates each having a size of 120 cm² and a thickness of 1.1 mm only exceeds 8 kg. The weight of the liquid crystal to be interposed between the substrates with the substrate space distance of 6 μm is 60 g. To attain such a size, even if rigid glass substrates are used, because of the large area, the glass substrates are buckled like pieces of paper even when the substrates are kept to stand.

In the case where the liquid crystal cell which is made by cementing the two large substrates is kept at an upright state, the cell takes a barrel shape whose lower portion expands. As a result, the substrate space distance of the lower portion of the cell is several times to several tens of times, sometimes several hundred times, greater than the substrate space distance of the upper portion of the cell so that a constant electric field would not be generated in the liquid crystal. In this case, it is impossible to attain the uniform display.

Also, in case of the ferroelectric liquid crystal, since the orientation of the liquid crystal takes a layer structure, the layer structure is broken down by the deformation of the substrates to cause a fatal damage such as failure of display. This phenomenon would readily be generated even in a small cell having a display area of 5 cm². This is one of serious problems from which the ferroelectric liquid crystal display suffers.

The structure of the conventional liquid crystal electrooptical device has been shown in FIG. 1. The part for fixing the two substrates at a constant interval is only the place of the sealant provided around the peripheral portions of the glass substrates and the internal part is supported only by the spacers. Accordingly, it is natural that the larger warpage is generated in accordance with a distance from the seal portion.

As one of the countermeasures therefor, from time to time, the adhesive particles have been conventionally diffused into the cell interior in addition to the outer marginal sealant adhesives to bond the two substrates. However, it is likely that the orientation would be turbulent around the adhesives.

Further describing the problems inherent in the conventional techniques, a magnitude of the voltage to be applied to the two substrates is one of the main factors for determining the condition of the liquid crystal molecules between the substrates but it is well known that impurities having electric charges obtained from the liquid crystal or the orientation film are present in the conventional device or an extra charge for generating a voltage which is applied in the reverse direction of the applied voltage is generated.

These charges are freely moved within the liquid crystal layer clamped between the two substrates in accordance with the application of the voltage. The major part of the charges will move and reach the orientation film surface but will not move beyond the film surface because the orientation film is inherently insulative. As a result, the charges are accumulated between the orientation film and the liquid crystal layer (i.e., orientation film-liquid crystal interface).

The accumulation of the charges would cause undesirable problems against the liquid crystal electrooptical device. For instance, an effect for canceling the voltage applied between the two substrates would occur. When the liquid crystal molecules are sufficiently reversed, it is necessary to apply a higher voltage to be applied than necessary for reversing the spontaneous polarization. Also, when the voltage is applied between the substrates, the amount of charge within the liquid crystal layer is changed by time so that the condition of the liquid crystal molecules is unstable. Furthermore, the liquid crystal molecules electrically adsorbed by the charge accumulated in the orientation film-liquid crystal interface have a higher voltage, which is necessary for changing the condition, than the charge within the liquid crystal layer which has not been adsorbed. Therefore, the liquid crystal molecules are not simultaneously changed in condition. As a result, the most significant problem for the characteristics of the liquid crystal electrooptical device, i.e., the instability of the light permeability is caused.

In order to solve this problem, there have been provided a method for selecting the orientation film material that suppresses the accumulation of the charge or for orientating the liquid crystal molecules by orthorhombically depositing $SiO_2$ on the electrode instead of the orientation film that is an insulating film. Such a method however requires many preliminary experiments so that it takes a long time to increase a cost therefor, and also, the effect is changed by the combination of materials. Accordingly, it is not safe to say that such a method is general or practical. Also, there is a method for refining the liquid crystal to remove impurities. However, an amount of the usable liquid crystal through refining according to this method is small. Accordingly, this method is unsuitable for mass-production systems.

Also, a method has been proposed in which the charges that are present within the liquid crystal layer are adsorbed or coupled by using charge moving carriers so that positive and/or negative charges are kept under a plus/minus zero condition (hereinafter referred to as "canceling" or "neutralizing"). It is however difficult to measure and incorporate, into the device, such a suitable amount of charge moving carriers that may completely cancel the charges. If the amount of the charge moving carriers within the liquid crystal layer would be insufficient, it would be impossible to cancel the undesired charge, and the extra amount of the charge moving carriers would move within the liquid crystal layer in the same manner as the above-described charges. As a result, a problem would be involved in this method.

As described above, there have been proposed various method for canceling the charges that are present within the liquid crystal layer, which is a factor for causing the voltage change to be applied to the liquid crystal layer, i.e., a factor for causing the condition change of the liquid crystal molecules on the time basis to make the optical characteristics unstable. Nevertheless, there is no method for completely cancel the charge with ease.

SUMMARY OF THE INVENTION

Accordingly, in order to solve the various problems described above, an object of the present invention is to provide a liquid crystal electrooptical device in which substrates are bonded to each other without turbulence of an orientation condition of a liquid crystal material and a method therefor.

Also, another object of the present invention is to provide a high performance liquid crystal electrooptical device that excludes an adverse effect caused by undesired charges within a liquid crystal layer to stabilize optical characteristics of the device without flickering or tone change.

According to the present invention, there is provided a liquid crystal electrooptical device comprising: a pair of light permeable substrates having electrodes on surfaces thereof with the electrodes confronting each other inwardly; an electrooptical modulating layer comprising a liquid crystal material and interposed between the pair of substrates; orientation means interposed between the pair of substrates for orientating the liquid crystal material in a constant direction on an inside surface of at least one of the pair of substrates; and a polymerized columnar spacer which is adhesively bonded to the orientation means and/or the substrates and is formed by precipitating and curing a non-cured resin which has been mixed into the liquid crystal material.

According to the present invention, also, there is provided a liquid crystal electrooptical device comprising: a pair of light permeable substrates having electrodes on surfaces thereof with the electrodes confronting each other inwardly; an electrooptical modulating layer comprising a liquid crystal material and interposed between the pair of substrates; and orientation means interposed between the pair of substrates for orientating the liquid crystal material in a constant direction on an inside surface of at least one of the pair of substrates; wherein the liquid crystal material contains a resin material and a reaction initiator.

According to the present invention, also, there is provided a liquid crystal electrooptical device comprising: a pair of light permeable substrates having electrodes on surfaces thereof with the electrodes confronting each other inwardly; an electrooptical modulating layer comprising a liquid crystal material and interposed between the pair of substrates; and orientation means interposed between the pair of substrates for orientating the liquid crystal material in a constant direction on an inside surface of at least one of the pair of substrates; wherein the liquid crystal material contains a reaction initiator.

According to the present invention, also, there is provided a liquid crystal electrooptical device comprising a pair of substrates each having an electrode on a surface of the corresponding one of the substrates with electrode surfaces confronting each other inwardly, and an electrooptical modulating layer comprising a liquid crystal material and interposed between the pair of substrates, wherein a reaction initiator is present in the liquid crystal material.

According to the present invention, also, there is provided a method for producing a liquid crystal electrooptical device, comprising the following steps of: filling a liquid crystal mixture of a liquid crystal material, a resin forming material and a reaction initiator in between a pair of confronting substrates having electrodes on inside surfaces and an orientation film on at least one of the inside surfaces; separating the liquid crystal material and the resin forming material in the liquid crystal mixture; and cleaving (opening/tearing) the reaction initiator.

According to the present invention, also, there is provided a method for producing a liquid crystal electrooptical device, comprising the following steps of: filling a liquid crystal mixture of a liquid crystal material and a reaction initiator in between a pair of confronting substrates having electrodes on inside surfaces; and cleaving (opening/tearing) the reaction initiator.

According to the present invention, also, there is provided a method for producing a liquid crystal electrooptical device comprising the following steps of: precipitating a non-cured resin from a mixture of the non-cured resin and a liquid crystal material interposed between a pair of light permeable substrates confronting each other; orientating the liquid crystal material; curing the non-cured resin; and again orientating the liquid crystal material.

According to the present invention, also, there is provided a method for producing a liquid crystal electrooptical device comprising the following steps of: heating a mixture of a liquid crystal material and a non-cured resin interposed between a pair of light permeable substrates confronting each other so that the liquid crystal material in the mixture exhibits an isotropic phase; gradually cooling the mixture; curing the non-cured resin; heating the mixture so that the liquid crystal material exhibit an isotropic phase; and again gradually cooling the liquid crystal material.

According to the present invention, also, there is provided a method for producing a liquid crystal electrooptical device, comprising the following steps of: filling a mixture of a liquid crystal material and a non-cured resin to be cured by either one of an ultraviolet ray and a heat in between a pair of confronting substrates having electrodes on inside surfaces thereof; precipitating the resin from the mixture; and thereafter, curing the precipitated resin by the ultraviolet ray and the heat.

According to the present invention, also, there is provided a method for producing a liquid crystal electrooptical device, comprising the following steps of: interposing a sealant for bonding a pair of confronting substrates at least one of which has light permeability, and a mixture of a liquid crystal material and a non-cured resin between the substrates; precipitating the non-cured resin in the form of columns from the mixture; and thereafter, curing the sealant and the non-cured resin in a single step.

According to the present invention, also, there is provided a method for producing a liquid crystal electrooptical device, comprising the following steps of: forming a sealant on a periphery of a first substrate; dropping a mixture of a liquid crystal material and a non-cured resin onto the first substrate; cementing (disposing) a second substrate onto a surface on which the mixture has been dropped; precipitating the non-cured resin from the mixture; and curing the sealant and the non-cured resin.

According to the present invention, also, there is provided a method for forming an electrooptical device comprising the steps of:

interposing between a pair of confronting substrates at least one of which has light permeability, a mixture of a liquid crystal material and a non-cured resin, and a sealant for bonding said confronting substrates;

precipitating said non-cured resin in the form of columns from said mixture; and curing said sealant and said non-cured resin in a single step after said precipitating step.

According to the present invention, a liquid crystal mixture in which a non-cured resin material made of resin constituents (monomer or oligomer) and a reaction initiator is added to the liquid crystal material is clamped between the substrates of the liquid crystal electrooptical device and the resin is cured between the substrates, so that the substrate space distance is fixed without disturbing the orientation of the liquid crystal and the undesired charges within the liquid crystal layer are removed.

Also, the undesired charges are removed by the action of the reaction initiator.

A basic structure of a liquid crystal electrooptical device according to the present invention will be described with reference to FIG. 4. Orientation films 104 and 105 are formed as means for orientating liquid crystal on at least one of light-transmissive substrates 102 and 103 having electrodes and leads 100 and 101 and polarization plates 112 and 113. Also, for example, silica beads 106 are used as spacers for keeping the substrate space distance constant, and the two substrates are fixed by sealant 107. The device is constituted in such a manner that column-like resins 108 for bonding the upper and lower substrates are located between the substrates, and resin mass 109 and liquid crystal 110 and/or reaction initiators 111 in the resins and liquid crystal are diffused and clamped between the substrates.

In the liquid crystal electrooptical device according to the present invention, the reaction initiators which have been added upon formation are uniformly diffused into the liquid crystal mixture. Even if the resin constituent material is precipitated and separated from the liquid crystal mixture so that the resin constituent material is expelled from the liquid crystal material at a room temperature, the above-described reaction initiators are held as being held within the liquid crystal mixture. Even if the reaction initiators are cleaved (opened and torn) for curing the resin material, the reaction initiators are present in the left liquid crystal material. Also, the resin material is cured in the form of a column or post for bonding the upper and lower substrates and the orientation film surfaces or present in the liquid crystal layer as a mass (solid resin material).

The column-like resin according to the present invention means a post-like resin spacer and will be referred to as a polymerized column spacer (PCS).

In order to produce the liquid crystal electrooptical device, liquid crystal material, resin forming material and reaction initiator are mixed together, and heated until the liquid exhibits an isotropic phase so that the liquid crystal and the resin are well mixed. The liquid crystal mixture that has been produced by agitating is clamped between the substrates of the device. When the temperature of the device is gradually decreased from the temperature at which the liquid crystal mixture exhibits the isotropic phase, the resin forming material is excluded from the liquid crystal mixture and is present separately in the device. Also, although the reaction initiator is diffused into the liquid crystal material, even if the temperature of the device is decreased, the diffused reaction initiator will not be extruded from the liquid crystal material. For this reason, the reaction initiator in the liquid crystal device is present on both the resin forming material part and the liquid crystal material part.

If the undesired charge is simply removed without forming the column-like resin, it is sufficient to mix only the reaction initiator into the liquid crystal material without using the resin forming material.

It is preferable to heat and agitate the liquid crystal mixture up to the temperature at which the liquid crystal material exhibits the isotropic phase. When the liquid crystal material is gradually cooled down to a temperature that the liquid crystal material exhibits a liquid crystal phase, the resin forming material is separated and excluded from the liquid crystal material.

When the reaction initiator in the device is cleaved (opened and torn), charges are generated, a part of the charges contributes to curing of the resin and another part of the charges serves to directly cancel the extra charges within the device.

If the percentage of the area of the cured resin relative to the surface portion of the liquid crystal electrooptical device is in the range of 0.1 to 20%, it is possible to obtain a satisfactory display characteristic as the liquid crystal electrooptical device and a mechanical strength of the device per se.

Also, upon the production of the liquid crystal mixture, since the resin material (i.e., non-cured resin) which is generally available on the market is produced by adding the reaction initiator to the resin forming material, it is possible to produce the liquid crystal mixture by mixing the resin material into the liquid crystal material, or otherwise to change the amount of the reaction initiator to be added to the resin material and to separate the resin forming material and the reaction initiator to separately mix the material.

The above-described reaction initiator may be added in advance into the liquid crystal material, or may be mixed into the orientation film material as the orientation means, or may be coated on the orientation film surface. Namely, the reaction initiator 111 may be mixed into the orientation films 104 and 105 or coated on the surfaces thereof.

It is most preferable to use an ultraviolet ray exciting cleaving (opening/tearing) type reaction initiator as the reaction initiator. In this case, the polarizing plates 112 and 113 are provided on the substrates 102 and 103 after the reaction initiator is cleaved (opened and torn) by projecting ultraviolet rays thereon.

Also, the amount of addition of the reaction initiator may be changed, as desired, in response to the cleanliness of the substrates or the refinement of the liquid crystal material. For the basic standards, it is preferable to set it in the range 0.001 to 10% relative to the liquid crystal material, and more preferably in the range of 1 to 3% for solving the above-described problems.

The liquid crystal used in the present invention is for example twisted nematic liquid crystal, super twisted nematic liquid crystal, ferroelectric liquid crystal, or antiferroelectric liquid crystal.

"Formation of Column-Like Resin"

According to the present invention, the resin forming material is separated and precipitated from the mixture of the liquid crystal material between the substrates and the non-cured resin (the resin forming material (i.e., monomer or oligomer) and the reaction starter), the liquid crystal material is orientated, and thereafter its reaction initiator is cleaved (opened or torn) to cure the resin in the form of columns thereby bonding the two substrates together at a fixed substrate interval.

Under the condition that the temperature of the mixture of the liquid crystal material and the non-cured resin interposed between the substrates is heightened so that the liquid crystal material contained in the mixture exhibits the isotropic phase, it is impossible to distinguish the non-cured resin and the liquid crystal over each other and the mixture is uniform. However, when the temperature is decreased down to a room temperature, the non-cured resin is excluded from the liquid crystal material to be precipitated and diffused between the substrates. In this stage, it is possible to cure the diffused resin into the columns (posts) to bond the two substrates by applying the resin curing means to the mixture.

In order to enhance the orientation of the liquid crystal, it is preferable to gradually cool the mixture down to a temperature at which the liquid crystal material exhibits the liquid crystal phase after the mixture of the liquid crystal material and the non-cured resin has been heated so that the liquid crystal material shows the isotropic phase. In particular, in the case where the liquid crystal material exhibiting a smectic phase having a high regularity is used, the gradual cooling is effective to enhance the orientation. Also, it is possible to simultaneously separate and precipitate the non-cured resin from the mixture by this step. Thereafter, the resin is cured through a curing step.

Thus, according to the present invention, since the resin is cured after the liquid crystal material has been arranged in accordance with the orientation means, it is possible to keep a good liquid crystal orientation state before the curing, and there is a very small possibility that the resin that has been cured would adversely affect the orientation. Since the resin is to be cured under the good orientation state, it is quite natural to avoid the damage of the orientation after the curing of the resin.

The orientation of the liquid crystal material which is exhibited in the case where the content of the resin with respect to the mixture of the liquid crystal material and the non-cured resin is in the range of 0.1 to 20% is substantially the same as that exhibited by a regular cell in which only the liquid crystal material is interposed. The adverse effect of the mixture of the resin may be depressed to a low level.

When the mixture is cured, the percentage of the area of the cured resin in the columns or posts relative to the overall area of the surface portion as viewed from the substrate surface of the device is substantially identical with the percentage of the non-cured resin mixed into the mixture and is in the range of about 0.1 to 20%. Namely, almost all the non-cured resin mixed into the mixture is cured. The rest of the percentage, i.e., the percentage of the liquid crystal material is in the range of 80 to 99.9%. The amount of the mixture of the resin may be adjusted in response to a necessary force for bonding the two substrates. Naturally, the more the part of the resin cured in the surface portion, the more the mechanical strength of the liquid crystal cell per se, i.e., the force for keeping constant the substrate interval will become. However, an area through which light passes is decreased, as a result of which electrooptical characteristics such as a contrast ratio would be deteriorated. The numerical limitation that meets both the requirement of the mechanical strength and the electrooptical characteristics should be in the above-described range.

As the resin to be used in such a method, it is preferable to use a resin which exhibits a mixture state with the liquid crystal material under a condition at a high temperature and separates and precipitates from the liquid crystal material under a condition at a low temperature. It is preferable that the non-cured resin does not contain a solvent because the resin should be cured under the interposed condition between the two substrates. Furthermore, since the separation between the liquid crystal material and the resin or the formation of the orientation of the liquid crystal material largely depends upon the temperature, it is preferable to cure the resin depending upon another factor than the temperature. In view of this, for example, it is extremely suitable to use an ultraviolet ray curing type resin as the non-cured resin and to use an ultraviolet ray as the resin curing means to embody the invention.

"Cancellation of Undesired Charge"

Also, the present inventors have found that the undesired charge that is present within the liquid crystal layer to make the liquid crystal molecular state unstable may be canceled by curing the resin within the liquid crystal layer or by cleaving (opening/tearing) the reaction initiator comprising an ultraviolet ray exciting cleavage type material. Through such methods, the conventional problems such as a shift of charge and an accumulation of charge in the orientation film/liquid crystal interface may be solved. Accordingly, the voltage to be applied between the two substrates (i.e., electrodes) for clamping the liquid crystal layer will not be changed on the time basis and the undesired condition change will not occur in the liquid crystal molecules. It is therefore possible to readily control the electrooptical characteristics and the condition change of the liquid crystal molecules. Also, since the liquid crystal molecules are not adsorbed on the substrates, the overall liquid crystal layer simultaneously takes the condition change due to the application of the voltage. It is therefore possible to ensure stable electrooptical characteristics.

The mechanism for canceling the undesired charge within the liquid crystal layer is as follows.

Namely, firstly, the undesired charge is trapped into the resin to be canceled when the resin material cured. Secondly, the undesired charge is adsorbed or coupled to the reaction initiator diffused into the liquid crystal material to be canceled.

In the first method, the reaction caused when the ultraviolet ray curing resin is cured is utilized. Namely, the curing of the ultraviolet ray curing resin means that the polymerization of the monomer and the oligomer of the resin forming material is developed based on the starting factor of the charge generated by the excitation and cleaving (opening/tearing) of the reaction starter received an energy as a heat or a short wavelength ray such as, in particular, an ultraviolet ray, having a shorter wavelength than that of the visible ray. During the development of the polymerization, the reactivity of the side chain portions of the monomer and the oligomer is also increased (which will be referred to as an active state). The trapping the charge into the resin means that the undesired charge which is present within the side chain portions and the device is reacted. Also, since the cured resin is not readily decomposed by a regular process, there is no fear that the trapped charge would again move in the liquid crystal layer.

According to the above-described second method, the reaction initiator that has been diffused in the liquid crystal material after the gradual cooling generates a sufficient amount of charge enough to cancel the undesired charge by the positive projection of the ultraviolet ray during the resin curing. The extra charge more generated than necessary to cancel the undesired charge through the second method becomes stable while being re-coupled by itself.

Accordingly, even if only the reaction initiator is mixed into the liquid crystal material without using the resin forming material, it is possible to cancel the undesired charge per se that is present within the liquid crystal electrooptical device.

The generation rate of the charge according to the first and second methods is such that one or more charges, generally, two or more charges are generated from one reaction initiator, one or more charges are generated from one monomer molecule, and one or more, generally, two or more charges are generated from one oligomer molecule.

Sometimes, the reaction initiator is naturally cleaved (opened or torn) but it is easy to excite and cleave (open/tear) the reaction initiator by imparting a heat or a short wavelength ray such as, in particular, ultraviolet ray, having a shorter wavelength than that of the visible ray as an energy to thereby generate the charge. Also, the generated charge has a high reactivity and would readily be reacted with the other existing charges. If there is no charge, the cleaved (opened and torn) charges would be reacted with themselves to be kept under a stable state.

It is impossible to directly visually recognize whether or not the undesired charge is canceled. However, generally, it is possible to know the fact by the time-basis change of the current value when the voltage is applied to the device for a constant period of time or by the current value change when the applied voltage is continuously changed.

FIG. 5 shows the result of the measurement of the current value v.s. voltage change by applying a triangular wave of ±30 V and 5 Hz between the electrodes in the liquid crystal electrooptical device according to the present invention shown in FIG. 4. As is apparent from FIG. 5, only a current peak which is generated in accordance with the reversal of the spontaneous polarization in the positive and negative directions of the current (hereinafter referred to as a Ps peak) is confirmed in the liquid crystal electrooptical device according to the invention. In contrast, since the undesired charge is present in the liquid crystal layer in the conventional liquid crystal electrooptical device, another peak (hereinafter referred to as a second peak) in addition to the Ps peak shown in FIG. 5 is generated as shown in FIG. 7. The second peak shows the extra current caused by the undesired charge. The larger the second peak, the more remarkable the unstable condition of the liquid crystal molecules will become. In the liquid crystal electrooptical device according to the invention, almost no second peak is generated and the condition of the liquid crystal molecules is extremely stabilized.

In the liquid crystal electrooptical device, glass, polyethylene-terephthalate (PET) or the like is used as the substrate material, and a polarizing plate or a phase-difference plate containing polyvinyl alcohol (PVA) or polycarbonate as a primary composition is used for utilizing a uniaxial characteristic of the liquid crystal molecules and the light polarization caused by the uniaxial characteristic. In some cases, the ultraviolet ray absorbent may be mixed into the polarizing plate or the phase difference plate, and an ultraviolet ray absorbing filter is added to the device. Since the glass, the polarizing plate, the phase difference plate, the ultraviolet absorbent or the ultraviolet absorbing filter positively absorbs lights in the range of the wavelength less than that of the visible ray, there is almost no fear that the light having the wavelength less than that of the visible rays would reach the liquid crystal material and the resin in the normal operation of the device. Thus, there is no fear that the reaction initiator would be accidentally cleaved (opened or torn) after the completion of the production of the device.

Accordingly, the reaction initiator which has been added to the liquid crystal is naturally cleaved (opened or torn), and exhibits a stable condition without cleaving (opening/tearing) after the charges that cause the undesired condition change of the liquid crystal molecules appearing within the device have been canceled.

Also, in the case where the charges that cause the undesired condition change of the liquid crystal molecules appearing within such a device could not be canceled by the charges generated by the natural cleavage (opening/tearing) of the reaction initiators, for example, an energy such as an ultraviolet ray projection is positively applied thereto so that the charges which are necessary for canceling the above-described undesired charges may be provided from the reaction initiators. The extra charges generated by the reaction initiators more than necessary to cancel the undesired charges are re-coupled with themselves to provide a stable condition.

Also, if the reaction initiator is applied to the liquid crystal material, there is a fear that the liquid crystal material would be damaged. However, this phenomenon is never experienced according to the present invention.

In the present invention, a variety of operational modes of the liquid crystal may be utilized. For example, it is possible to use a nematic liquid crystal whose dielectric anisotropy is positive, more particularly, a TN type liquid crystal where the orientation direction of the liquid crystal molecules between the substrates is twisted by 90°, an STN (super twisted nematic) type liquid crystal where the orientation direction thereof is twisted by 80° to 270°, an STN (super twisted nematic) type liquid crystal where an angle (pre-tilt angle) defined between the substrate surfaces and the liquid crystal molecules is in the range of 3° to 10°, a nematic liquid crystal as the liquid crystal material where the dielectric anisotropy is negative, further a smectic liquid crystal or the like.

"Re-orientation after Resin Curing"

On the other hand, the resin is subjected to a volume shrinkage upon curing. In some cases, the liquid crystal molecules which have been arranged around the non-cured resin without any restriction after the separation between the resin and the liquid crystal would suffer from the orientation turbulence in accordance with the volume shrinkage upon the curing of the resin to cause a degradation of contrast in accordance with the degradation of the electrooptical characteristics, in particular, the dark condition.

A voltage holding rate is one of indices representative of whether or not these electrooptical characteristics are stable against the time lapse (aging). The "voltage holding rate" means a value which represents how long the voltage applied to one pixel for a short period of time is held after the removal of the application of the voltage. In other words, it means how the orientation of the liquid crystal molecules are held. Accordingly, to enhance the voltage holding rate, it is preferable that the liquid crystal molecules are more stable and the orientation is uniform.

For this reason, it is desired that the turbulence of the liquid crystal material including the periphery of the resin in accordance with the volume shrinkage of the column-like resin after curing is prevented to enhance the orientation, the voltage holding rate and hence, the optical electrooptical characteristics.

To meet this requirement, it is preferable to produce the mixture between the liquid crystal material and the non-cured resin between the pair of confronting light-transmissive substrates through a step of precipitating the non-cured resin from the mixture, a step of orientating the liquid crystal material, a step of curing the non-cured resin and a step of re-orientating the liquid crystal material.

Namely, the precipitation of the non-cured resin material and the orientation of the liquid crystal are effected to the mixture of the liquid crystal material and the non-cured resin within the cell by the gradually cooling step, and thereafter, the non-cured resin is cured. In this case, if the shrinkage of the volume of the resin is large, there is a fear that a turbulence would occur in the orientation of the liquid crystal around the resin. Thereafter, a step (hereinafter referred to as an aging step) of re-orientating the liquid crystal material by, for example, heating and gradually cooling the liquid crystal material is effected to thereby obviate the turbulence of the orientation around the resin to enhance the voltage holding rate, and hence the electrooptical characteristics.

"Simultaneous Curing of Sealant and Column-Like Resin"

The injection of the mixture of the resin and the liquid crystal (liquid crystal mixture) into the cell when the liquid crystal electrooptical device having the column-like resin is produced is carried out into an empty cell which is made by cementing the substrate together by a vacuum method or a heating capillary action method. In this case, a time, large-scale equipment and the like are needed-for evacuating the space. Also, since a step for precipitating and curing the column-like resin is needed, the number of the steps is large in comparison with the general liquid crystal electrooptical device.

In order to simplify the manufacturing steps and to shorten the manufacturing time, it is preferable to carry out the curing steps of the peripheral sealant of the substrates and the non-cured resin precipiced in the form of columns from the mixture in a single step.

For example, it is preferable to produce the liquid crystal electrooptical device through a step of forming the sealant around the peripheral portion of the first substrate, a step of dropping the mixture of the liquid crystal material and the cured resin onto the first substrate, a step of cementing the second substrate onto the surface onto which the mixture is dropped, a step of precipitating the non-cured resin from mixture, and a step of curing the sealant and the non-cured resin.

In this case, it is effective to use an ultraviolet ray curing type resin as the sealant and the non-cured material resin and to use an ultraviolet ray as a curing means for curing the sealant and the non-cured resin.

The process for producing the liquid crystal electrooptical device using the column-like resin with such a structure includes the steps of dropping the liquid crystal, cementing the substrates, precipitating the column-like resin and projecting the ultraviolet rays (i.e., curing the sealant and the column-like resin). In this case, the liquid crystal injection step is dispensed with, and the ultraviolet ray projection step may be carried out only once.

Namely, when the substrates are cemented together, the liquid crystal mixture is dropped on one of the substrate, and is clamped by the two substrate so that the liquid crystal mixture is filled in the cell. Then, the resin is precipitated from the liquid crystal material into the column-like shapes. After the resin has been precipitated into the column-like shapes, the ultraviolet rays are projected over the entire cell surface including the seal portions so that the seal portions and the column-like resin may be cured by a single step. Also, the re-gap step may be dispensed with. Accordingly, it is possible to simplify the manufacture steps and to shorten the manufacture time.

"Curing by Ultraviolet Rays and Heat"

Also, in general, in an active type liquid crystal electrooptical device, in the case where TFT (thin film transistor) elements or MIM elements are provided on the substrates, a light shielding film for preventing the light projection over the elements is provided on the substrate, on the confronting side of the elements, for stabilizing the operation. Accordingly, in the case where the regular ultraviolet ray curing type resin is used for forming the column-like resin, the ultraviolet rays projected from the confronting substrate could not reach the non-cured resin that is present in the element portion so that the non-cured resin is left in the non-cured condition. As a result, it is impossible to ensure a sufficient substrate strength.

Also, in some cases, the resin which is thus left non-cured is dissolved into the liquid crystal material and acts as an impurity when the temperature is elevated. As a result, the operation of the device is adversely effected. For example, the display would be unstable.

In order to cure the non-cured resin at the portion having a region to be shielded from the ultraviolet rays in such a light shielding film and to prevent the degradation of the mechanical strength of the device and the operational characteristics thereof, it is possible to use heat in addition to the ultraviolet ray projection to cure the non-cured resin.

In this case, it is preferable to use acrylic transforming epoxy resin as a resin that is to be cured by either one of the ultraviolet rays and heats.

Namely, the part, where the ultraviolet rays are to be shielded, of the resin material which becomes the column-like resin is cured mainly by the heats and the other part is cured by the ultraviolet rays by using the acrylic transforming epoxy resin that is to be cured by either one of the ultraviolet rays and heats.

Thus, the resin precipitated in the column-like shapes at the part to which the ultraviolet ray projection is to be effected is completely cured by the ultraviolet ray projection. The other part of the resin material is light-shielded and hence the ultraviolet rays could not be used as an energy source. However, it is possible to cure the resin at this part by heating. Accordingly, even if the light-shield film is provided, it is possible to prevent the degradation of the mechanical strength and the operational characteristics of the device.

As described above, according to the present invention, it is possible to diffuse the resin between the substrates and to bond the two substrates by the resin. As a result, it is possible to keep constant the substrate space distance even in the liquid cell having a large surface area.

Also, according to the present invention, the extra condition change of the liquid crystal molecules due to the charges within the device, which problem is involved in the conventional liquid crystal electrooptical device, may be solved by positively canceling the charges per se, presenting in the device, by the charges from the reaction initiator.

Also, according to the present invention, since the charges corresponding to the extra cancellation, which has been caused by using the charge moving carrier in the conventional device, are not generated, it is possible to obtain optical stability of the device for a long period of time.

BRIEF DESCRIPTION OF THE DRAWINGS

In the accompanying drawings:

FIG. 8 shows optical characteristics in the case where a pulse voltage is applied to a liquid crystal electrooptical device according to the comparison example for Embodiment 4;

FIG. 9 shows optical characteristics in the case where a pulse voltage is applied to a liquid crystal electrooptical device according to another comparison example for Embodiment 4;

FIG. 12 shows optical characteristics in the case where a pulse voltage is applied to a liquid crystal electrooptical device according to comparison examples for Embodiments 5 and 6;

FIG. 16 shows optical characteristics in the case where a pulse voltage is applied to a liquid crystal electrooptical device according to Embodiment 7;

FIG. 18 shows optical characteristics in the case where a pulse voltage is applied to a liquid crystal electrooptical device according to the comparison example for Embodiment 7;

FIG. 25 shows optical characteristics in the case where a pulse voltage is applied to a liquid crystal electrooptical device according to the comparison example 1;

FIG. 26 shows optical characteristics in the case where a pulse voltage is applied to a liquid crystal electrooptical device according to the comparison example 2.

DESCRIPTION OF THE PREFERRED EMBODIMENTS

Embodiment 1

Embodiments 1-8 show examples in which adhesive column-like spacers are formed within a liquid crystal cell.

Figure 2:
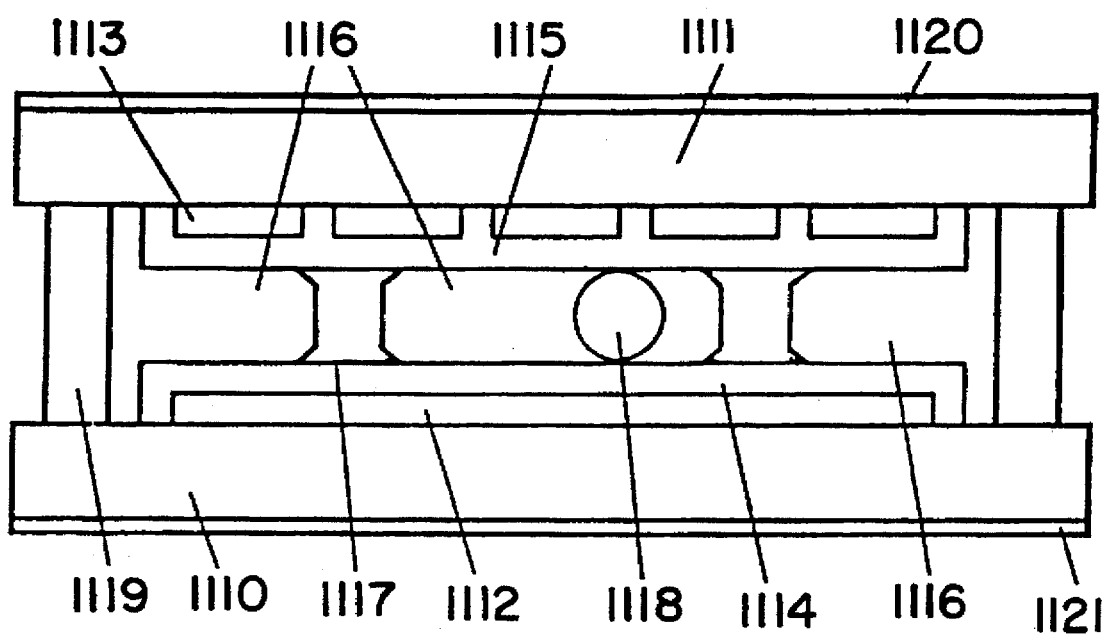
FIG. 2 is a schematic view showing a basic structure of the present invention.

An example in which the present invention is applied to a liquid crystal electrooptical device using a ferroelectric liquid crystal will be described with reference to FIG. 2.

Indium tin oxides 1112 and 1113 (hereinafter referred to ITOs) were deposited on blue plate glasses 1110 and 1111 of 10 cm$^2$ into a film thickness in the range of 500 to 2,000 Å by a sputtering method or a deposition method. In this example, the ITOs were deposited to a film thickness of 1,000 Å and were patterned by a regular photolithographic step. Polyimides 1114 and 1115 were coated on these substrates by a spin coating method and were baked at a temperature of 280° C. The polyimides were LQ5200 made by Hitachi Kasei Co., LP-64 made by Toray Co. and RN-305 made of Nissan Chemical Co. The thickness thereof was in the range of 100 to 300 Å, and in the example, was 100 Å.

These substrates were subjected to a rubbing treatment for a uniaxial orientation treatment. Shinshikyu spacers 1118 made of silica particles by Catalyst Kasei Co. were sprayed on one of the substrates and sealants 1119 made of epoxy resin were formed on the other substrate by a screen printing method. Both the substrates were cemented at a distance of an electrode interval of 1.5 μm by the spacers to form a cell.

A biphenyl system ferroelectric liquid crystal mixture was used as a liquid crystal material 1116. The structural formula is given as follows:

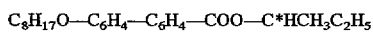

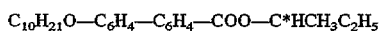

These two materials were mixed with a ration of 1:1. The phase system row was an isotropic phase-smectic A phase-smectic C*-crystal. An ultraviolet ray curing type resin which was available on the market was used as the resin. The mixture rates of the non-cured resin in the mixture of the non-cured resin and the liquid crystal material were 5% and 15%, respectively. The rests of 95% and 85% were the rates of the liquid crystal material. The mixture of the resin caused a transition point of the liquid crystal material and the like from the isotropic phase to the liquid crystal phase to be lowered by 5° to 20° C.

The cell and the liquid crystal were heated at 100° C. and the liquid crystal was injected into the cell under the vacuum condition. Thereafter, the assembly is gradually cooled in the range of 2° to 20° C./hr, and in the example, it was gradually cooled down to a room temperature at the rate of 3° C./hr. When the orientation condition at a room temperature was observed by a polarizing microscope after the gradual cooling step, the orientation of the liquid material exhibited the uniaxial orientation along the rubbing direction. Namely, a good optical quenching level was confirmed through the polarizing microscope.

The resin was precipitated in the form of spots among the liquid crystal materials. The resin did not exhibit the birefringence and was observed as the black condition through the polarizing microscope. Thus, it was understood that under this condition, the liquid crystal material and the non-cured resin could be separated from each other.

Next, the resin within the cell was cured by projecting the ultraviolet rays onto the cell. The intensity of the ultraviolet rays is preferably in the range of 3 to 30 mW/cm$^2$. In this example, the intensity was 10 mW/cm$^2$. The projection time is preferable in the range of 0.5 to 5 minutes. In this example, the projection time was one minute.

The orientation of the liquid crystal material after the projection of the ultraviolet rays exhibited a good orientation condition which was substantially the same as that in the observation through the polarizing microscope prior to the projection of the ultraviolet rays.

The results of the measurement in which a square wave was applied to the cell and the contrast ratio was measured are shown in Table 1.

TABLE 1

Measurement Results of Electrooptical Characteristics

|  | mixture rate of resin in mixture (%) | |
| --- | --- | --- |
|  | 5 | 15 |
| ON permeability (%) | 30 | 27 |
| OFF permeability (%) | 0.6 | 0.6 |
| contrast ratio | 50 | 45 |

Figure 1:
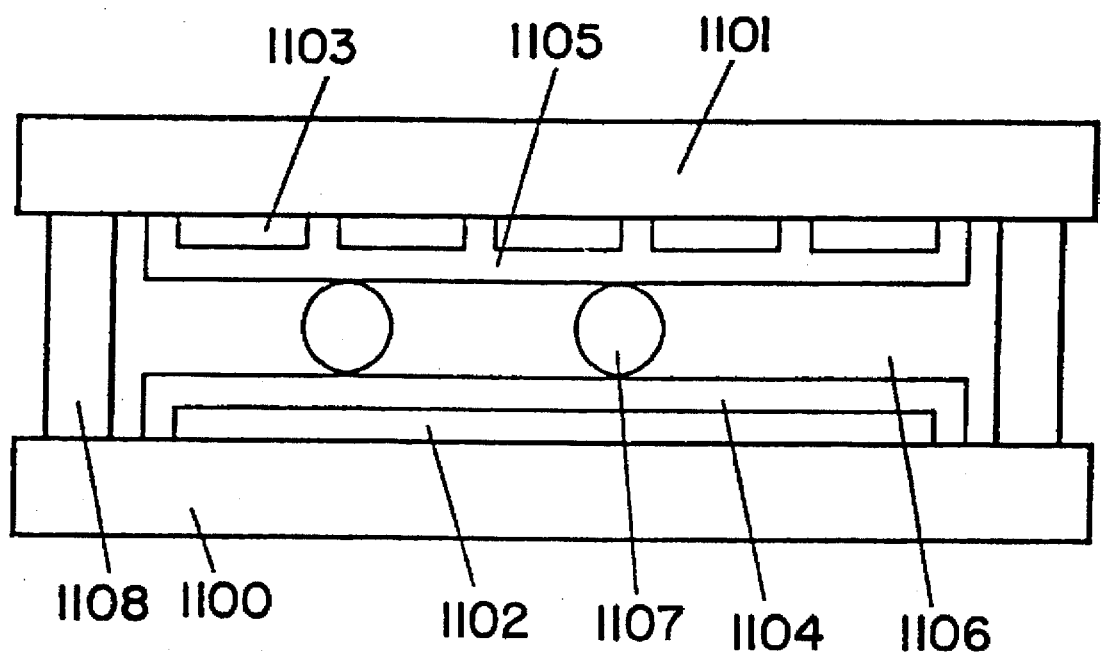
FIG. 1 is a schematic view showing a conventional liquid crystal cell.

As shown in FIG. 1, since an area of the portion where the switching was not effected was increased at a higher rate of the resin in the mixture, the ON permeability was somewhat lowered. However, in the OFF permeability was not affected thereby. With respect to the contrast ratio which was the quotient of these rates, there was no substantial difference. A good contrast ratio was ensured. Also, when the cells were viewed through bare eyes, the presence of the resin was not observed at all. From these results, it was understood that if the rate of the non-cured resin in the mixture was in the range of about 0.1 to 20%, it was possible to provide the device which was compatible with the conventional device. In other words, it was preferable that the rate of occupation of the liquid crystal material in the area of the display portion should be 80 to 99.9%.

Next, in order to confirm the effect of the gradual cooling process, the change of the orientation condition when the cooling rate was changed was observed. The results thereof are shown in Table 2.

TABLE 2

Relationship of Gradually Cooling Rate and Orientation Condition

| gradual cooling rate (°C./hr) | orientation condition |
| --- | --- |
| 200 | wide portion where no uniaxial orientation was exhibited |
| 100 | wide portion where no uniaxial orientation was exhibited |
| 20 | uniaxial orientation |
| 2 | uniaxial orientation |

As shown in Table 2, in the embodiment, above the gradual cooling rate of 100° C./hr, the part where the liquid crystal material was not in the uniaxial orientation is formed. Below about 20° C./hr, it was possible to obtain the good uniaxial orientation which has no practical problem at all. It was possible to obtain the good uniaxial orientation by the gradually cooling process. Thereafter, polarizing plate 1120 and 1121 are cemented on the substrates 1110 and 1111 to complete the cell.

Thus, it was possible to produce the cell having the constant electrode space distance. Even if the produced cell was held in an upright state, any non-uniform display or the like was not observed at all. Any deformation of the substrates or the like would not occur and the layer structure of the used ferroelectric liquid crystal would not be damaged.

Figure 27:
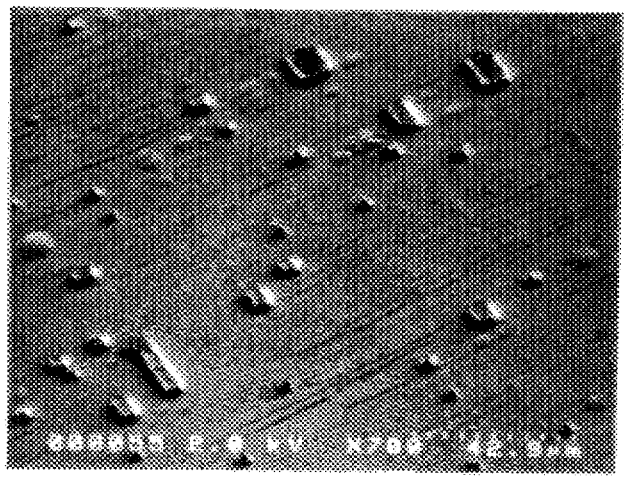
FIG. 27 is an SEM picture of fine patterns formed on a substrate.

When the resin left on the substrates was observed through a scanning type electronic microscope after the substrates were peeled off and the liquid crystal was cleaned with alcohol, the column-like resin which had been used to fix the two substrates was observed as shown in FIG. 27.

The shape of the resin was changed by the phase transition system row of the liquid crystal material and the gradual cooling rate. The space where the column-like resin was present was about 10 to 100 μm.

Figure 3:
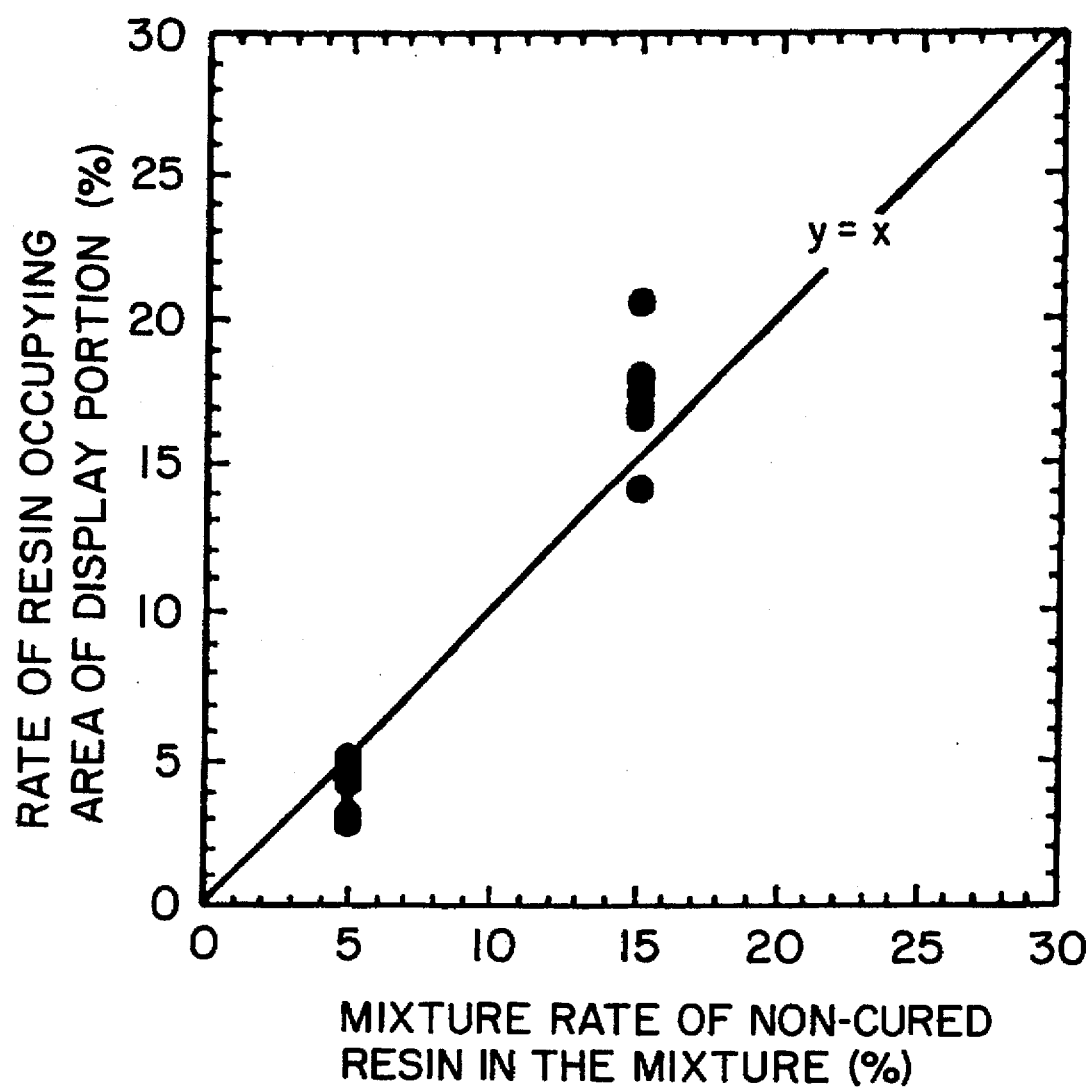
FIG. 3 is a graph showing a relationship between a rate of resin occupying an area of a display portion and a mixture rate of non-cured resin in the mixture.
Figure 4:
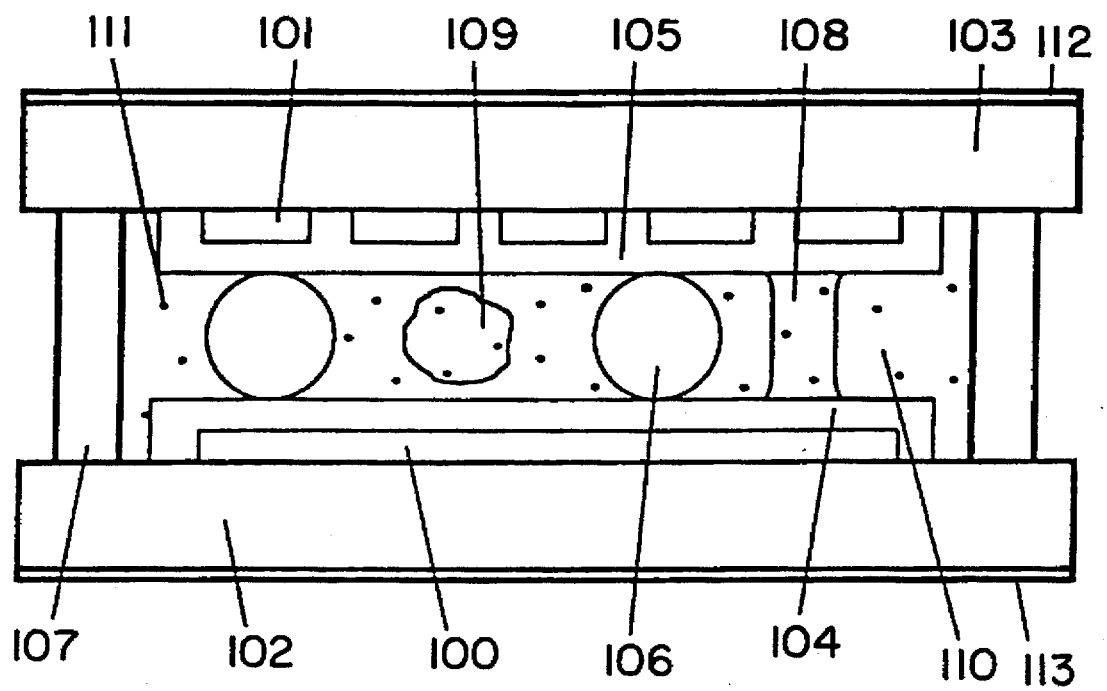
FIG. 4 is a schematic view showing a structure of a liquid crystal electrooptical device according to the present invention.

FIG. 3 shows a relationship between the rate of occupation of the resin over the area of the display portion and the mixture rate of the non-cured resin in the mixture. As was apparent from FIG. 3, the two factors were substantially the same. In other words, it was apparent that almost all the mixed non-cured resin was cured in column-shapes.

Embodiment 2

An embodiment in which an STN type liquid crystal is used as the liquid crystal material will be described.

SE-610 or SE-4110 made by Nissan Chemical Co. was deposited, by an offset printing technique using a stripe coater, as the orientation film on the substrate, having a diagonal size of 15 inches, on which ITO's were deposited and subjected to a patterning process. It is preferable to set the baking temperature in the range of 200° to 300° C. In this embodiment, the baking temperature was 280° C. It is preferable to set the film thickness in the range 600 to 1,000 Å. In this embodiment, the film thickness was 800 Å. The two substrates were subjected to the rubbing treatment so that an angle of the rubbing directions of the upper and lower confronting substrates was 240°. Furthermore, spacers made of silica and having a diameter of 6.5 μm were sprayed over one of the substrate, and the seal printing was applied to the other substrate. Then, the substrates were heated and bonded together with the processed surfaces being directed inwardly.

ZLI-2293 made by Merck Co. was used as the liquid crystal material, S-811 was added as the chiral material (chiral agent) by 0.1 to 3%, 0.12% in the embodiment. The pitch adjustment was carried out. The ratio of the cell thickness to the pitch was set in the range of 0.50 to 0.55. The mixture of the ultraviolet curing resin to the liquid crystal by 5% was injected into the above-described cell under the vacuum condition. After the cell was pressed to exclude the extra liquid crystal after the injection, the cell had been heated for one hour at 120° C. and cooled down to a room temperature.

The ultraviolet rays of 3 to 30 mW/cm$^2$ (10 mW/cm$^2$ in the embodiment) were projected to cure the inner resin. The resin was diffused in the cell. The cell was combined with a color compensation plate to form a TSTN panel.

Since the two substrates were fixed by the inner adhesive polymerized column spacers, it was possible to keep constant the electrode space distance in spite of the large area of 15 inches in diagonal size. The contrast ratio was 15 when this cell was driven at a duty 200. Thus, it was possible to obtain the panel which has the same contrast ratio as that of the conventional device which does not contain the resin.

Embodiment 3

An embodiment in which the present invention is applied to a birefringence control effect type liquid crystal electrooptical device will now be described.

SE-7511L and RN715 made by Nissan Chemical or LQ-1800 made by Hitachi Kasei was sprayed on the ITO provided substrates as the orientation film and was baked at a temperature in the range of 250° to 300° C. (300° C. in the embodiment). The film thickness was in the range of 500 to 1,000 Å (600 Å in the embodiment). The orientation film was the highly hydrophobic orientation film in which the vertical orientation could readily be formed relative to the nematic liquid crystal. The cell having the electrode space distance of 6 μm was formed by using the substrates. The mixture containing the ultraviolet ray curing resin by 5% to ZLI-4318 nematic liquid crystal made of Merck Co. which showed the negative dielectric anisotropy was injected into the cell. The dielectric anisotropy of the liquid crystal material was −2.0.

The ultraviolet rays were projected after the gradual cooling step, so that the diffused resin was cured. When a conoscopic image was observed through a polarizing microscope under this condition, a cruciform image was observed to show that the liquid crystal molecules were arranged vertically relative to the substrate surfaces. The contrast ratio when the drive voltage was applied to the cell was 80 . Also, a non-uniformity in display could be extremely suppressed. Thus, under such an orientation condition and at the contrast ratio, the two substrates could be fixed by the resin while leaving the liquid crystal characteristics obtained when the resin was not contained.

Embodiment 4

An embodiment in which the present invention is applied to a liquid crystal electrooptical device using a ferroelectric liquid crystal will now be described.

Indium tin oxides (hereinafter referred to ITOs) were deposited on a pair of glass substrates of 30 $cm^2$ with a thickness of 1.1 mm into a film thickness in the range of 500 to 2,000 Å by a sputtering method or a deposition method. In this embodiment, the ITOs were deposited to a film thickness of 1,000 Å and were patterned by a regular photolithographic step. Polyimides were coated on these substrates by a spin coating method and were baked at a temperature of 280° C. The polyimides were RN-305 made by Nissan Chemical Co. or LP-64 made by Toray Co (In the embodiment, LP-64 made by Toray Co. was used). The thickness of the polyimide film was in the range of 100 to 800 Å, and in this example, was 150 Å. These substrates were subjected to a rubbing treatment for a uniaxial orientation treatment. Shinshikyu spacers made of silica particles by Catalyst Kasei Co. were sprayed on one of the substrates as the spacers and sealants made of epoxy resin were formed on the other substrate by a screen printing method. Both the substrates were cemented at a distance of an electrode interval of 1.5 μm to form a cell. In order to prevent a short-circuit between the electrodes, an insulating film is provided on the electrodes and the leads on the substrates. The orientation film may be provided thereon.

The material used in the embodiment was ferroelectric liquid crystal CS1014 made by Chisso Co. The Ps of the liquid crystal was 5.4 nC/$cm^2$. Its phase system row was I (isotropic phase)-N (nematic phase)-A (smectic A phase)-C* (smectic C* phase).

The resin material used in the embodiment was an ultraviolet ray curing type resin which was available on the market. The reaction initiator was Irgercure 369 made by Ciba Geigy Co. which had a high reactivity of the well known initiators and by which the effect of the invention was most effectively attained.

The 95% liquid crystal material and the 5% resin forming material to which the reaction initiator was added as the resin material were mixed together, and were heated at a temperature of 100° C. and agitated so that the liquid crystal exhibited the isotropic phase for the better mixture of the resin material and the liquid crystal material. As a result, the mixed resin was well uniformly mixed into the liquid crystal material to obtain the liquid crystal mixture. The amount of addition of the reaction initiator to the total sum of the resin forming material was 3%.

The cell and the liquid crystal mixture was heated up to 100° C. and was gradually cooled down to a room temperature at 2° to 20° C./hr (2° C./hr in this embodiment) under the vacuum condition after the injection into the cell. When the orientation condition was observed through a polarizing microscope at a room temperature after the gradual cooling step, the resin material was diffused into the cell in the form of spots. The orientation of the liquid crystal material exhibited the uniaxial orientation along the rubbing direction in the same manner as the liquid crystal material to which no resin was added. A good optical quenching level was obtained.

The ultraviolet rays were injected to the cell with an intensity of 3 to 30 mW/$cm^2$ for a period of time of 0.5 to 5 minutes (intensity of 20 mW/$cm^2$ and for 1 minute in the embodiment) to thereby cure the resin. Also after the projection of the ultraviolet rays, the liquid crystal has a uniaxial orientation along the rubbing direction of the orientation film to obtain a good optical quenching level. The rate of the resin occupying the area of the display portion of the cell was about 5%. The cured resin could be observed through a microscope but the presence of the cured resin could not be visually confirmed at all. A polarizing plate and the like were added to the cell to complete the liquid crystal electrooptical device.

Figure 5:
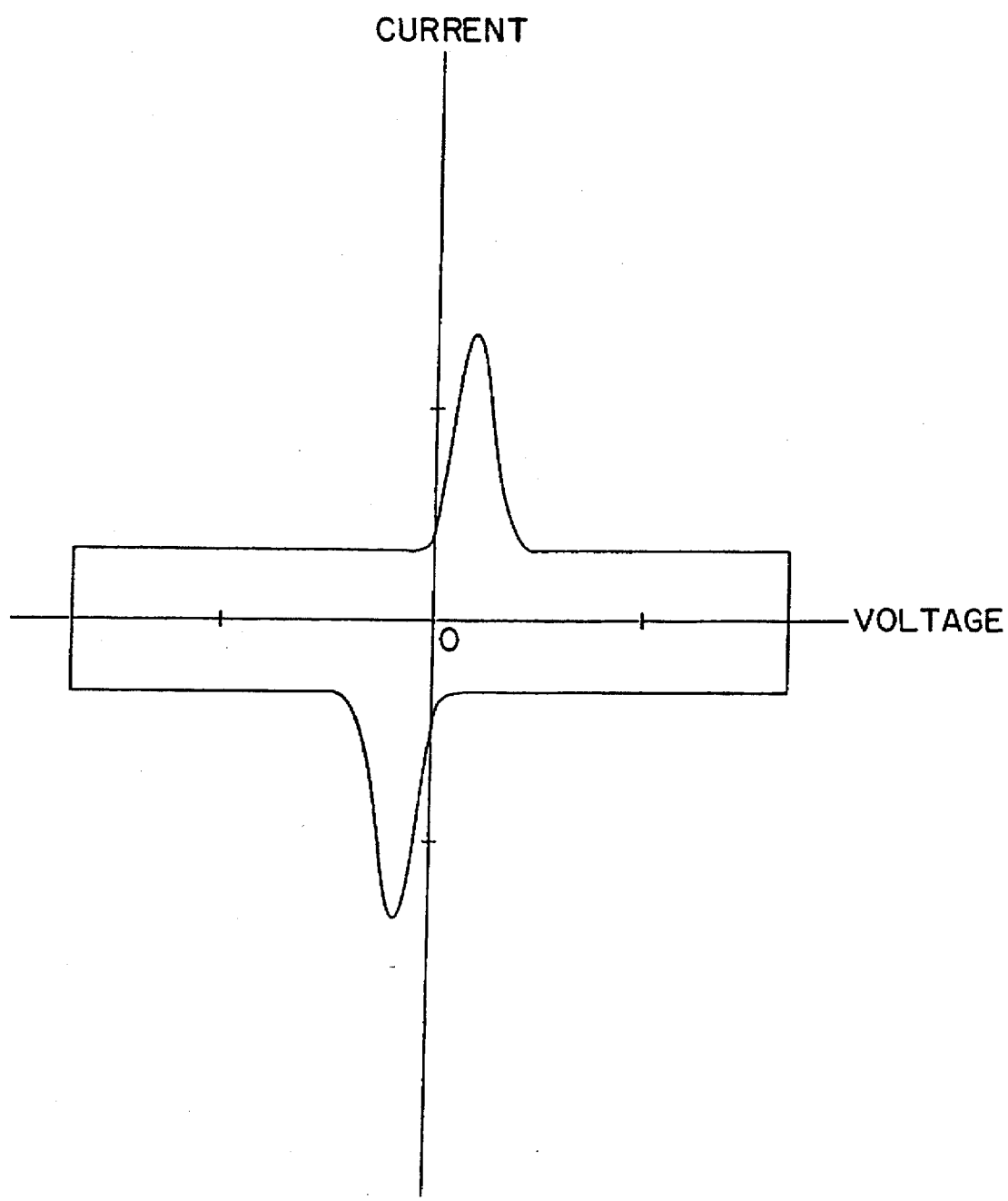
FIG. 5 shows current-voltage characteristics of a liquid crystal electrooptical device according to Embodiment 4.

When a triangular wave of ±30 V and 5 Hz was applied between the upper and lower electrodes of the liquid crystal electrooptical device so that the voltage was continuously changed, the measurement of the characteristics of the current (hereinafter referred to as current-voltage characteristics) was carried out. As a result, the reversal of the spontaneous polarization of the liquid crystal molecules through 180°, i.e., the reversed Ps peak was observed as shown in FIG. 5.

Figure 6A:
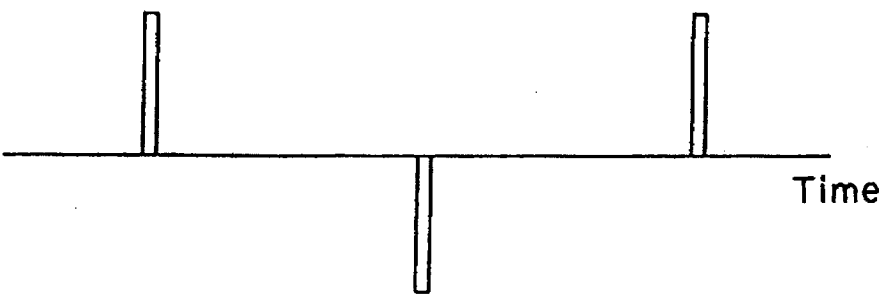
FIG. 6 shows optical characteristics in the case where a pulse voltage is applied to a liquid crystal electrooptical device according to Embodiments 4, 5 and 6.
Figures 6B, 6C:
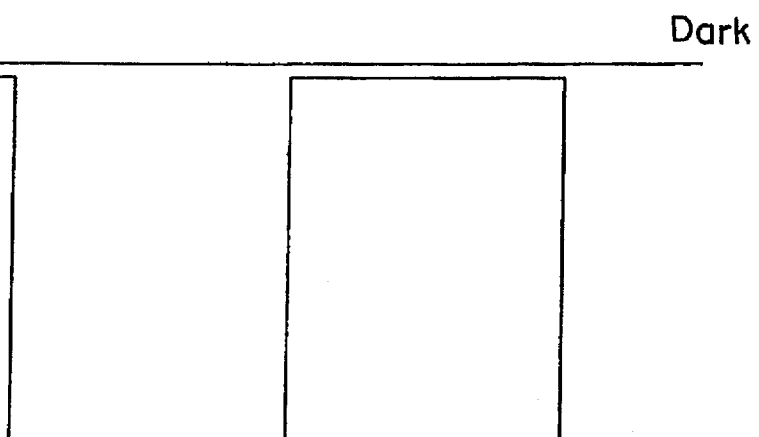

The optical characteristics are shown in FIG. 6 in the case where a pulse of 1 μsec and 15 V was applied between the electrodes at every one second (upon non-application, the circuit was opened). In the embodiment of the present invention, figures showing the current-voltage characteristics and the optical characteristics are represented by relative values thereof, respectively. As was apparent from FIG. 6, a sharp bright-dark state reversal was generated upon the voltage application above the Ps peak voltage. It was apparent that the state was stable. Also, the memory characteristics upon the short-circuit state were good.

Even if the rate of the resin in the liquid crystal mixture was changed from 0.1 to 20%, the rate of the area of the resin occupying the surface portion in the cell was also in the range of 0.1 to 20% in the same way as the rate of the mixed resin. The resin was diffused in the cell. Also, the cell was cut in the thickness direction after the curing of the resin and the liquid crystal was cleaned and removed with methanol. Then, when the shape of the resin part was observed through an SEM, it was confirmed that the resin was presented in the form of columns or resin mass for bonding the upper and lower substrates.

In the thus produced liquid crystal electrooptical device, there was no display non-uniformity, flickering or the like. Thus, it was possible to provide the device having an extremely high performance and stable optical characteristics. Also, an active matrix type liquid crystal electrooptical device in which a plurality of pixel electrodes and thin film transistors for connecting with the plurality of pixel electrodes were formed on the inner surface of one of the substrate was produced while the liquid crystal mixture according to the embodiment was filled in the cell. It was therefore possible to provide the device which was of a high speed type and had a high contrast ratio. The substrate space distance was kept constant by the resin. In spite of the large area of 30 $cm^2$, even if the device was used in an upright condition, there was no enlargement of the substrate space distance due to the warpage of the substrates or there was no reduction of the substrate space distance when the substrate surface were pushed manually by, for example, operator's fingers. There was no turbulence in the layer structure and the orientation of the liquid crystal or no non-uniformity of the display.

For comparison, without mixing the resin material, i.e., the non-cured resin material and the reaction initiator into the liquid crystal material, the characteristics were measured with the same cell structure, manufacturing conditions and liquid crystal material. The liquid crystal and the cell were heated up to 100° C. and the liquid crystal was injected into the cell. The liquid crystal and the cell were gradually cooled. When the orientation condition was observed by a polarizing microscope after the gradually cooling step, the liquid crystal had a uniaxial orientation along the rubbing direction of the orientation film to show a good optical quenching level. The liquid crystal electrooptical device was produced by adding the polarizing plate and the like to the cell.

Figure 7:
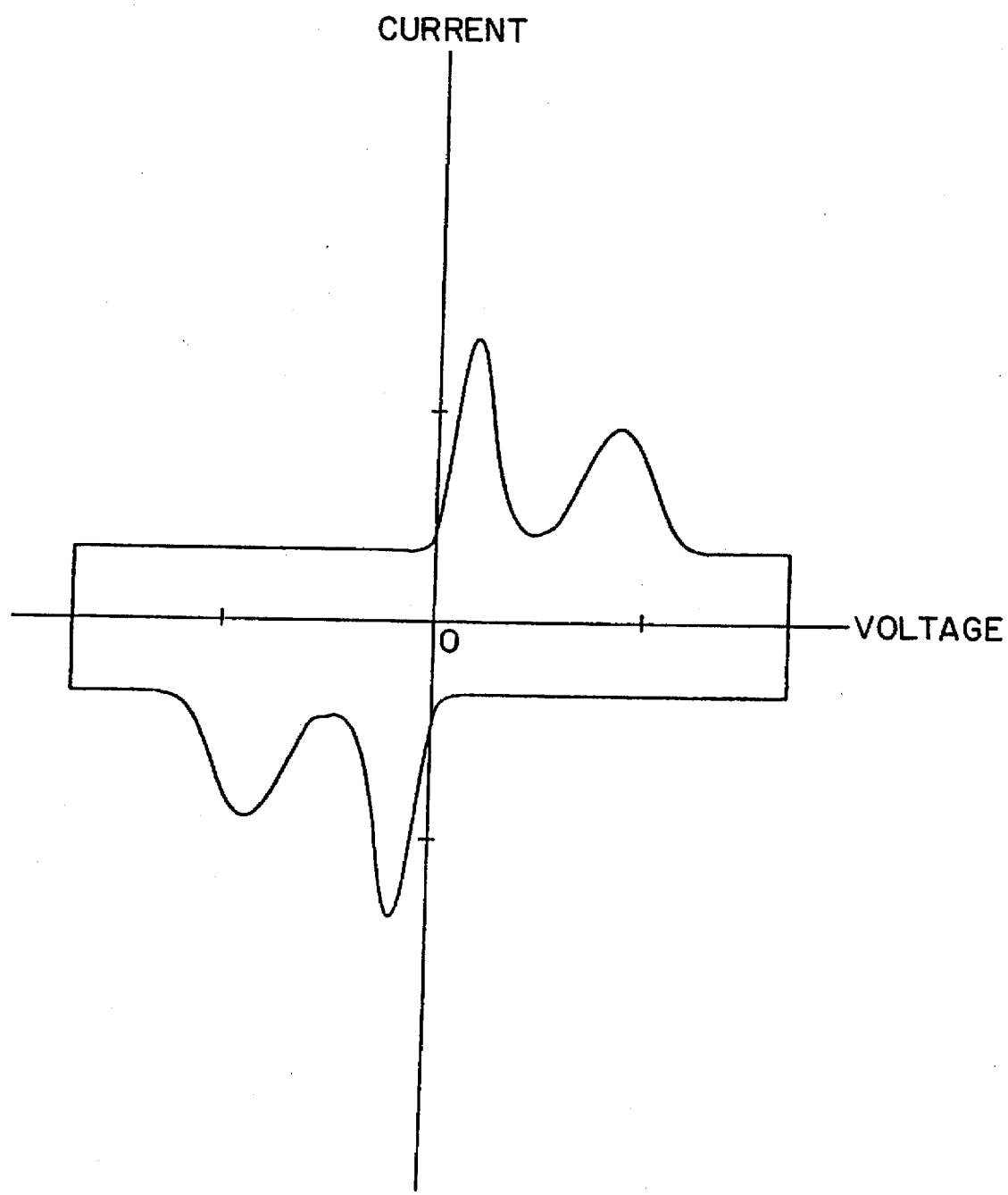
FIG. 7 shows current-voltage characteristics of a liquid crystal electrooptical device according to a comparison example for Embodiment 4.

When a triangular wave of ±30 V and 5 Hz was applied to this liquid crystal electrooptical device, the measurement of the current-voltage characteristics was carried out. As a result, the Ps peak and the increase/decrease of the current, i.e., second peak which might be considered as the movement of the charges within the device were measured as shown in FIG. 7.

The optical characteristics are shown in FIG. 8 in the case where a pulse of 1 μsec and 15 V was applied to this device at every one second and the device was driven under this condition. Although the liquid crystal molecules were reversed by the application of the voltage to exhibit the dark condition, this dark condition would be unstably changed to the bright condition in accordance with the lapse of time and thereafter also again toward the dark condition.

Also, if the device was used in an upright condition, the liquid crystal material was stagnant in the lower portion of the substrates so that the substrate space distance was increased locally at some parts. Also, if the parts would be pushed by the operator's fingers, the substrate space distance would be reduced. At the same time, the layer structure of the liquid crystal was damaged and there was non-uniformity in display.

Subsequently, the liquid crystal material and the resin material were mixed with 95% and 5%, respectively and the amount of the addition of the reaction initiator in the resin material was changed in the range of 0 to 10% relative to the total sum of the resin forming material and the reaction initiator.

In case of the additional amount of the reaction initiator of 0%, the liquid crystal exhibited the uniaxial orientation along the rubbing direction of the orientation film to obtain the good optical quenching level. However, when the triangular wave was applied and the current-voltage characteristics were measured, the Ps peak and the second peak were measured. The optical characteristics are shown in FIG. 9 in the case where a pulse of 1 μsec and 15 V was applied to this device at every one second and the device was driven. Although the liquid crystal molecules were reversed by the application of the voltage to exhibit the dark condition, this dark condition would be somewhat changed to the bright condition in accordance with the lapse of time. Although this device exhibited somewhat better characteristics than those of the case where the resin was not applied (FIG. 8), the instability was not yet solved. Also, the resin would not be cured.

In case of the additional amount of the reaction initiator of 0.3%, the resin was also cured and the generation of the second peak was prevented to improve the characteristics.

Embodiment 5

In this embodiment, the same structure of the device, the same rate of the liquid crystal and the resin, the same kind of the reaction initiator in the resin, and the same additional amount thereof were used as those of Embodiment 4.

CS1015 made of Chisso Co. with Ps of 6.6 C/cm$^2$ and with the phase system row of I-N-A-C* was used as the liquid crystal material. The resin material was added into the liquid crystal material and was heated up to 90° C. and agitated to be well mixed into the liquid material. The material was injected under the vacuum condition into the cell which had been heated up to 90° C. After the gradually cooling step, the resin was cured by the ultraviolet ray projection. The liquid crystal had the uniaxial orientation along the rubbing direction and exhibited the good optical quenching level. The polarizing plate and the like were added to the cell to provide the liquid crystal electrooptical device.

Figure 10:
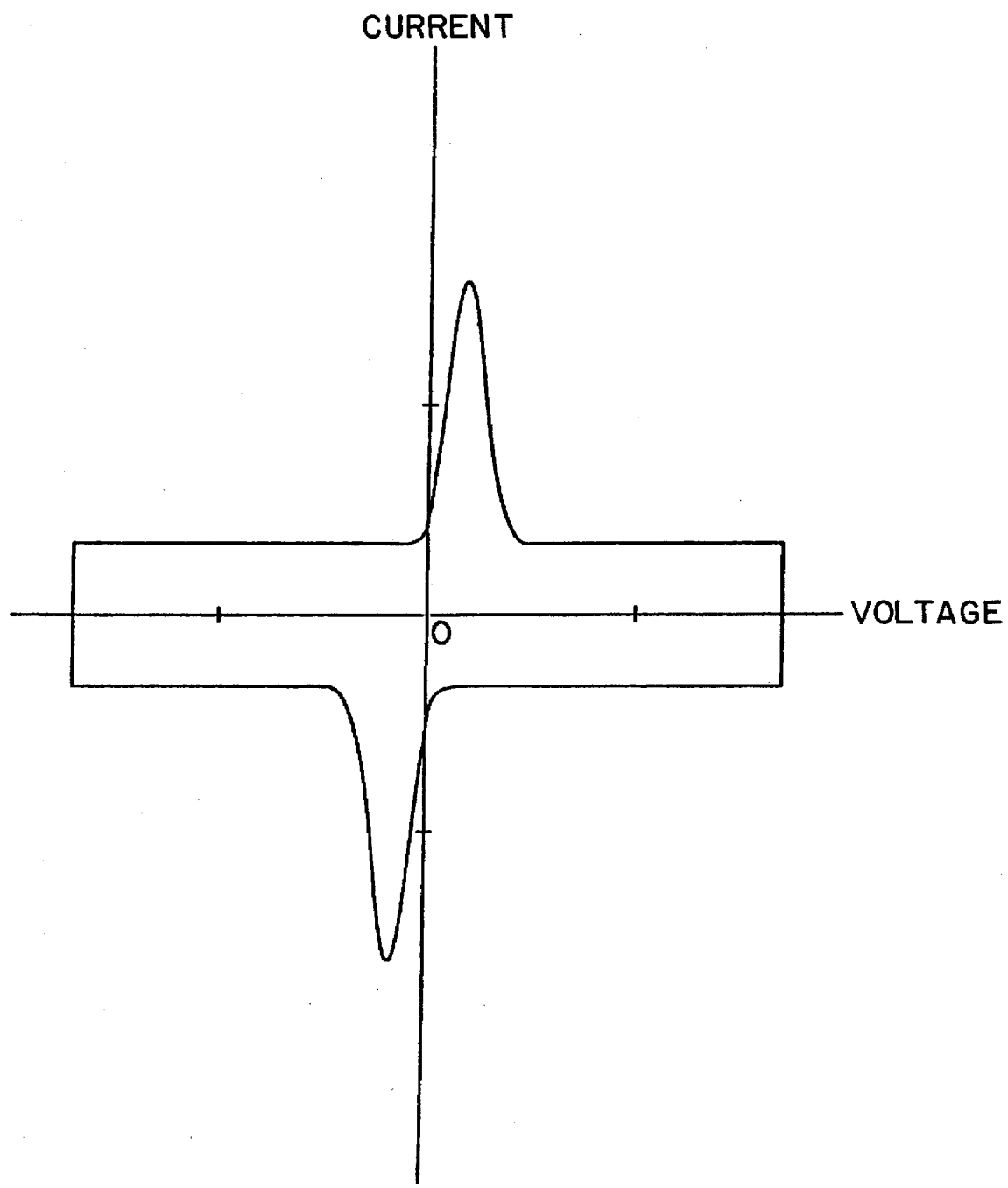
FIG. 10 shows current-voltage characteristics of a liquid crystal electrooptical device according to Embodiment 5.

When the triangular wave of ±30 V and 5 Hz was applied to this liquid crystal electrooptical device and the current-voltage characteristics were measured, it was possible to observe only the Ps peak as shown in FIG. 10.

In the case where a pulse of 1 μsec and 15 V was applied to this device at every one second (upon the non application of the voltage, the circuit was opened) and the device was driven, the optical characteristics thereof were the same as those of Embodiment 4. The liquid crystal molecules were abruptly reversed by the application of the voltage to keep stable the bright and dark conditions. Also, the memory characteristics upon the short-circuit state were good.

In the thus produced liquid crystal electrooptical device, there was no display non-uniformity, flickering or the like. Thus, it was possible to provide the device having an extremely high performance and stable optical characteristics. Also, an active matrix type liquid crystal electrooptical device in which a plurality of pixel electrodes and thin film transistors for connecting with the plurality of pixel electrodes were formed on the inner surface of one of the substrate was produced while the liquid crystal mixture according to the embodiment was filled in the cell. It was therefore possible to provide the device which was of a high speed type and had a high contrast ratio. The substrate space distance was kept constant by the resin. In spite of the large area of 30 cm$^2$, even if the device was used in an upright condition, there was no enlargement of the substrate space distance due to the warpage of the substrates or there was no reduction of the substrate space distance when the substrate surface were pushed manually by, for example, operator's fingers. There was no turbulence in the layer structure and the orientation of the liquid crystal or no non-uniformity of the display.

Figure 11:
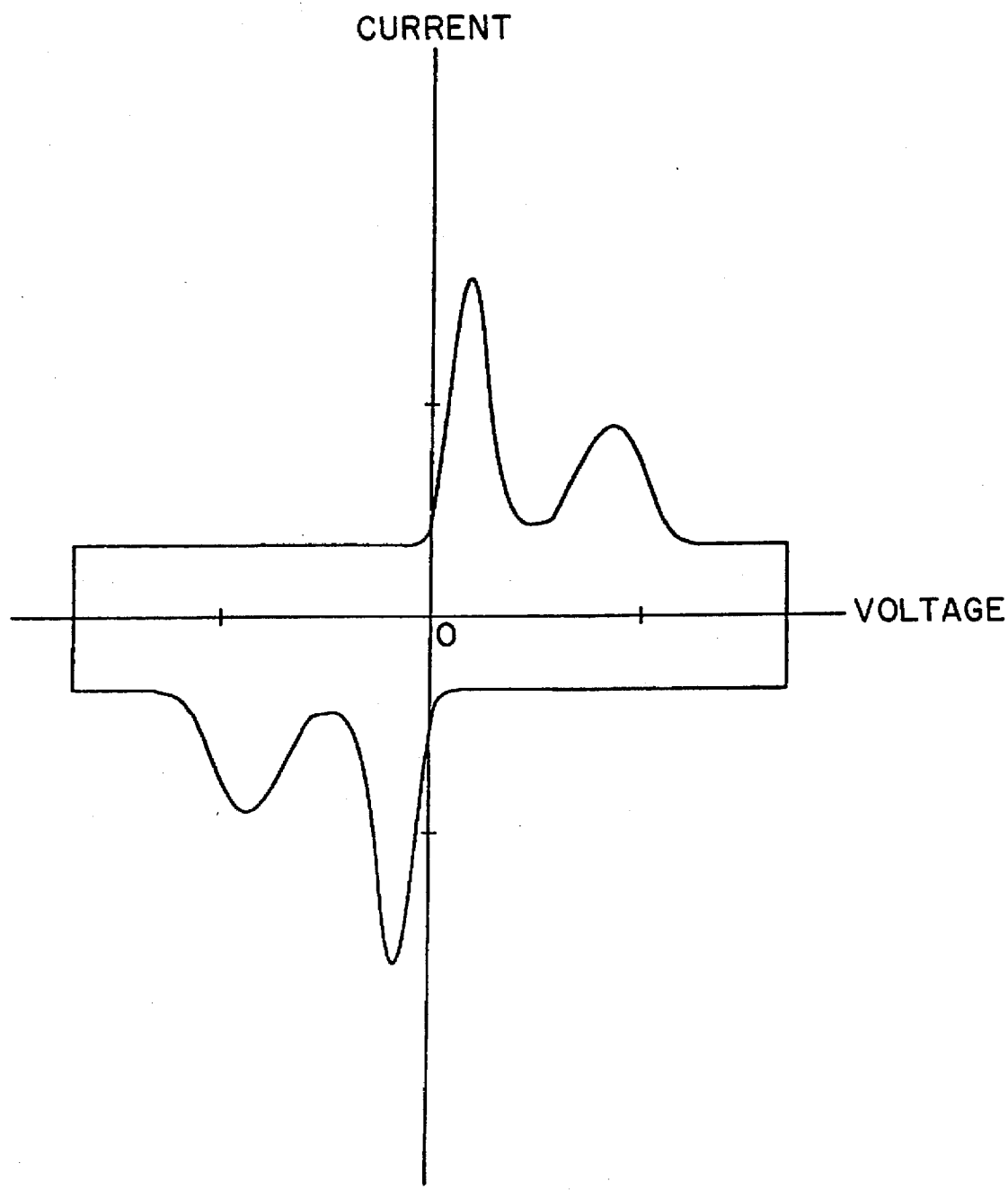
FIG. 11 shows current-voltage characteristics of a liquid crystal electrooptical device according to a comparison example for Embodiment 5.

For comparison, in the present embodiment, without mixing the resin material and the reaction initiator into the liquid crystal material, the characteristics were measured. The liquid crystal had a uniaxial orientation along the rubbing direction of the orientation film to show a good optical quenching level. However, when the triangular wave was applied between the electrodes and the current-voltage characteristics were measured, the Ps peak and the second peak were observed as shown in FIG. 11.

In the case where a pulse of 1 μsec and 15 V was applied to this device at every one second and the device was driven, the optical characteristics thereof are shown in FIG. 12. Although the liquid crystal molecules were reversed into the dark condition by the application of the voltage, they were soon unstably changed to the bright condition.

Also, if the device was used in an upright condition, the liquid crystal material was stagnant in the lower portion of the substrates so that the substrate space distance was increased locally at some parts. Also, if the parts would be pushed by the operator's fingers, the substrate space distance would be reduced. At the same time, the layer structure of the liquid crystal was damaged and there was non-uniformity in display.

Embodiment 6

In this embodiment, the same structure of the device, the same rate of the liquid crystal and the resin, the same kind of the reaction initiator in the resin, and the same additional amount thereof were used as those of Embodiment 4.

Figure 13:
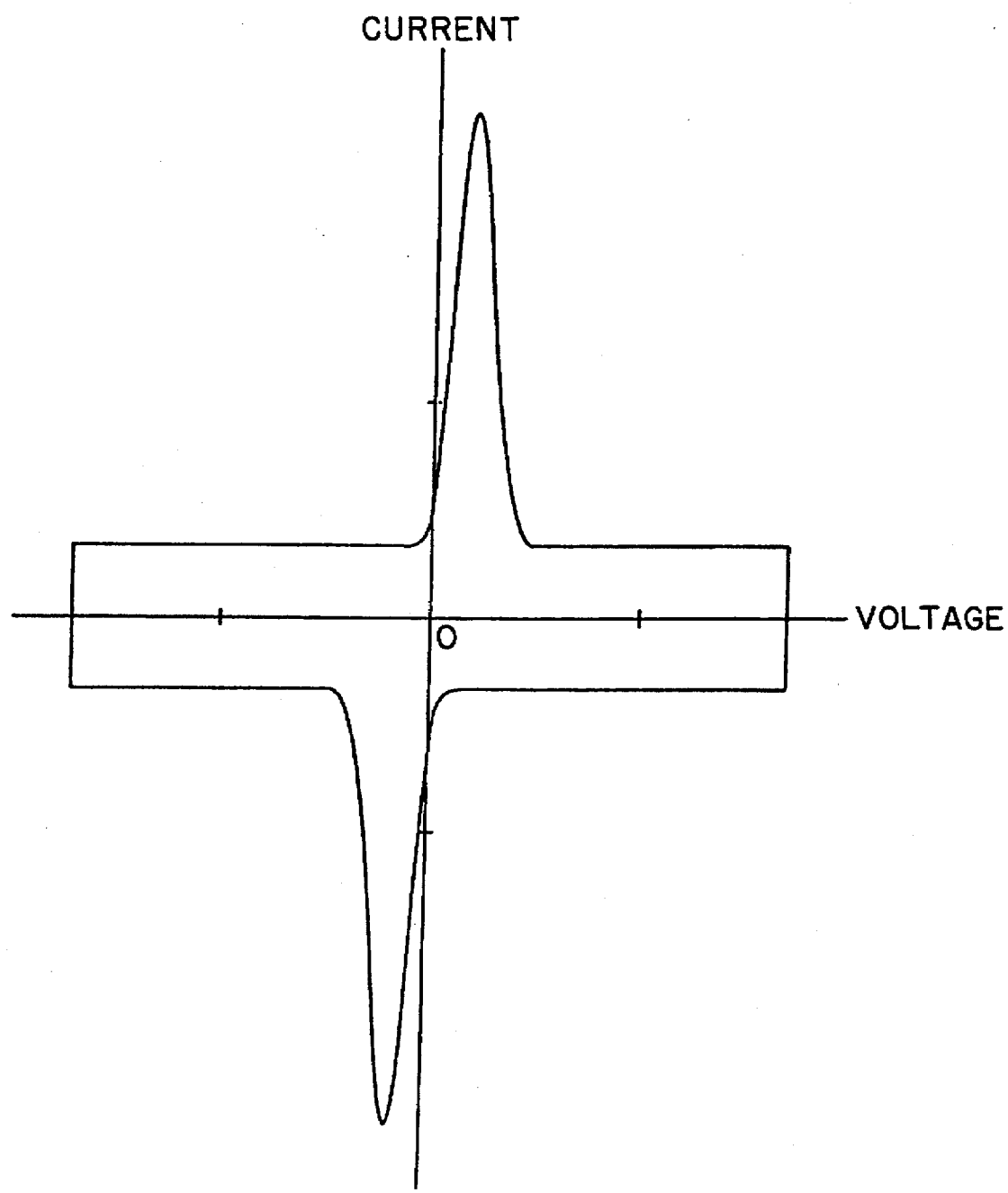
FIG. 13 shows current-voltage characteristics of a liquid crystal electrooptical device according to Embodiment 6.

CS1017 made of Chisso Co. with Ps of 9.3 nC/cm$^2$ and with the phase system row of I-N-A-C* was used as the liquid crystal material. The resin material was added into the liquid crystal material and was heated up to 80° C. and agitated to be well mixed into the liquid material. The material was injected under the vacuum condition into the cell which had been heated up to 80° C. Thereafter, the material is gradually cooled. After the gradually cooling step, the resin was cured by the ultraviolet ray projection. The liquid crystal had the uniaxial orientation along the rubbing direction and exhibited the good optical quenching level. The polarizing plate and the like were added to the cell to provide the liquid crystal electrooptical device. Only $P_s$ peak was observed as shown in FIG. 13 when measuring current change as a voltage applied to the liquid crystal electrooptical device is continuously changed.

In the case where a pulse of 1 μsec and 15 V was applied to this device at every one second (upon the non application of the voltage, the circuit was opened) and the device was driven, the optical characteristics thereof were the same as those of Embodiment 4. The liquid crystal molecules were abruptly reversed by the application of the voltage to keep stable the bright and dark conditions. Also, the memory characteristics upon the short-circuit state were good.

In the thus produced liquid crystal electrooptical device, there was no display non-uniformity, flickering or the like. Thus, it was possible to provide the device having an extremely high performance and stable optical characteristics. Also, an active matrix type liquid crystal electrooptical device in which a plurality of pixel electrodes and thin film transistors for connecting with the plurality of pixel electrodes were formed on the inner surface of one of the substrate was produced while the liquid crystal mixture according to the embodiment was filled in the cell. It was therefore possible to provide the device which was of a high speed type and had a high contrast ratio. The substrate space distance was kept constant by the resin. In spite of the large area of 30 cm$^2$, even if the device was used in an upright condition, there was no enlargement of the substrate space distance due to the warpage of the substrates or there was no reduction of the substrate space distance when the substrate surface were pushed manually by, for example, operator's fingers. There was no turbulence in the layer structure and the orientation of the liquid crystal or no non-uniformity of the display.

Figure 14:
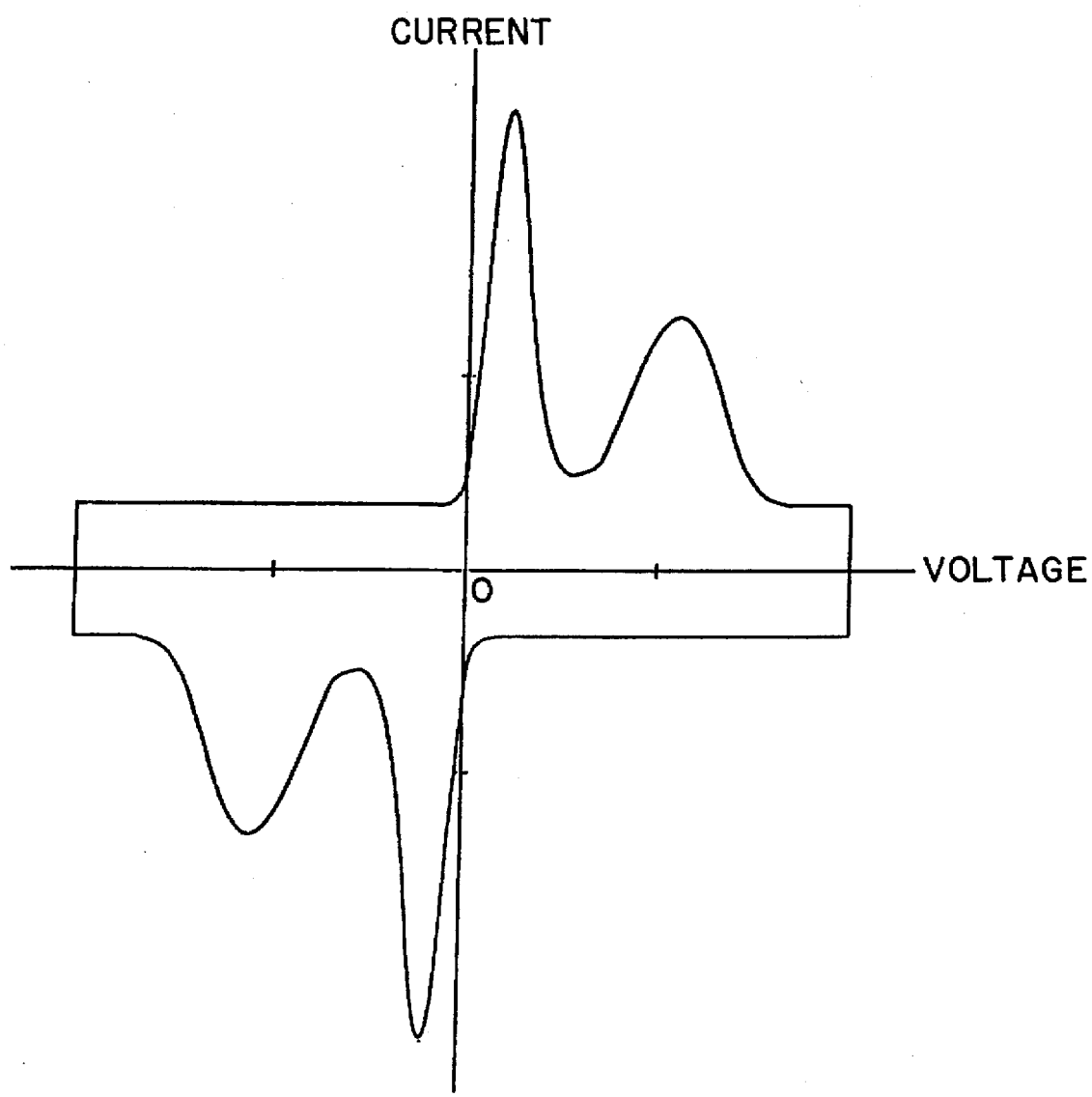
FIG. 14 shows current-voltage characteristics of a liquid crystal electrooptical device according to a comparison example for Embodiment 6.

For comparison, in the present embodiment, without mixing the resin material and the reaction initiator into the liquid crystal material, the characteristics were measured. The liquid crystal had a uniaxial orientation along the rubbing direction of the orientation film to show a good optical quenching level. However, when the triangular wave was applied between the electrodes and the current-voltage characteristics were measured, the Ps peak and the second peak were observed as shown in FIG. 14.

In the case where a pulse of 1 μsec and 15 V was applied to this device at every one second and the device was driven, the optical characteristics thereof were substantially the same as those of Embodiment 5 shown in FIG. 12. Although the liquid crystal molecules were reversed into the dark condition by the application of the voltage, they were soon unstably changed to the bright condition.

Also, if the device was used in an upright condition, the liquid crystal material was stagnant in the lower portion of the substrates so that the substrate space distance was increased locally at some parts. Also, if the parts would be pushed by the operator's fingers, the substrate space distance would be reduced. At the same time, the layer structure of the liquid crystal was damaged and there was non-uniformity in display.

Embodiment 7

In this embodiment, the same structure of the device, the same rate of the liquid crystal and the resin in the mixture was used as that of Embodiment 4.

However, the liquid crystal material used in this embodiment was ferroelectric liquid crystal. The Ps of the liquid crystal was 10.9 nC/cm$^2$. Its phase system row was I-A-C*. The resin material used in the embodiment was an ultraviolet ray curing type resin which was available on the market. As the reaction initiator, Irgercure 369 made by Ciba Geigy Co. was mixed so that the percentage was 1% relative to the total sum of the resin forming material and the reaction initiator.

In order to well mix the added resin material into the liquid crystal material, the liquid crystal was heated and agitated so that the liquid crystal exhibited the isotropic phase at 120° C. The mixture was injected into the cell heated at 120° under the vacuum condition. After the gradually cooling step, the ultraviolet rays were projected thereto to cure the resin. In the same way as the orientation direction of the liquid crystal material to which the resin had not been added, the liquid crystal had the uniaxial orientation along the rubbing direction of the orientation film to show a good optical quenching level. The polarizing plate and the like were added to the cell to provide the liquid crystal electrooptical device.

Figure 15:
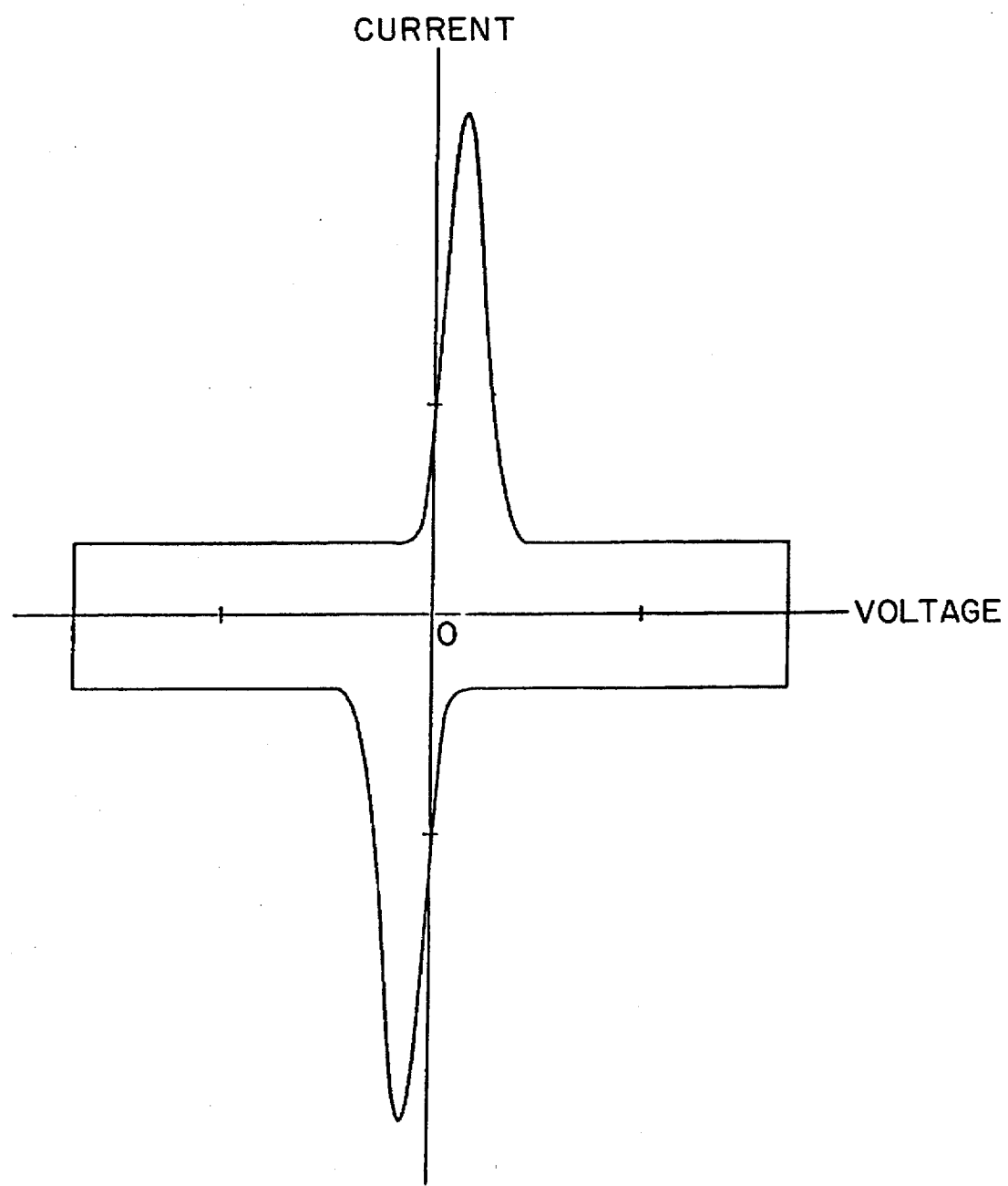
FIG. 15 shows current-voltage characteristics of a liquid crystal electrooptical device according to Embodiment 7.

When the voltage to be applied to the liquid crystal electrooptical device was continuously changed, the measurement of the current was carried out. As a result, only the Ps peak was observed as shown in FIG. 15.

In the case where a pulse of 1 μsec and 15 V was applied to this device at every one second (upon the non application of the voltage, the circuit was opened) and the device was driven, the optical characteristics thereof were shown in FIG. 16. The liquid crystal molecules were reversed between the dark condition and the bright condition by the application of the voltage to keep stable the bright and dark conditions. The optical characteristics were good and in particular, the dark condition was good and rather stable. Also, the memory characteristics upon the short-circuit state were good.

In the thus produced liquid crystal electrooptical device, there was no display non-uniformity, flickering or the like. Thus, it was possible to provide the device having an extremely high performance and stable optical characteristics. Also, an active matrix type liquid crystal electrooptical device in which a plurality of pixel electrodes and thin film transistors for connecting with the plurality of pixel electrodes were formed on the inner surface of one of the substrate was produced while the liquid crystal mixture according to the embodiment was filled in the cell. It was therefore possible to provide the device which was of a high speed type and had a high contrast ratio. The substrate space distance was kept constant by the resin. In spite of the large area of 30 cm², even if the device was used in an upright condition, there was no enlargement of the substrate space distance due to the warpage of the substrates or there was no reduction of the substrate space distance when the substrate surface were pushed manually by, for example, operator's fingers. There was no turbulence in the layer structure and the orientation of the liquid crystal or no non-uniformity of the display.

Figure 17:
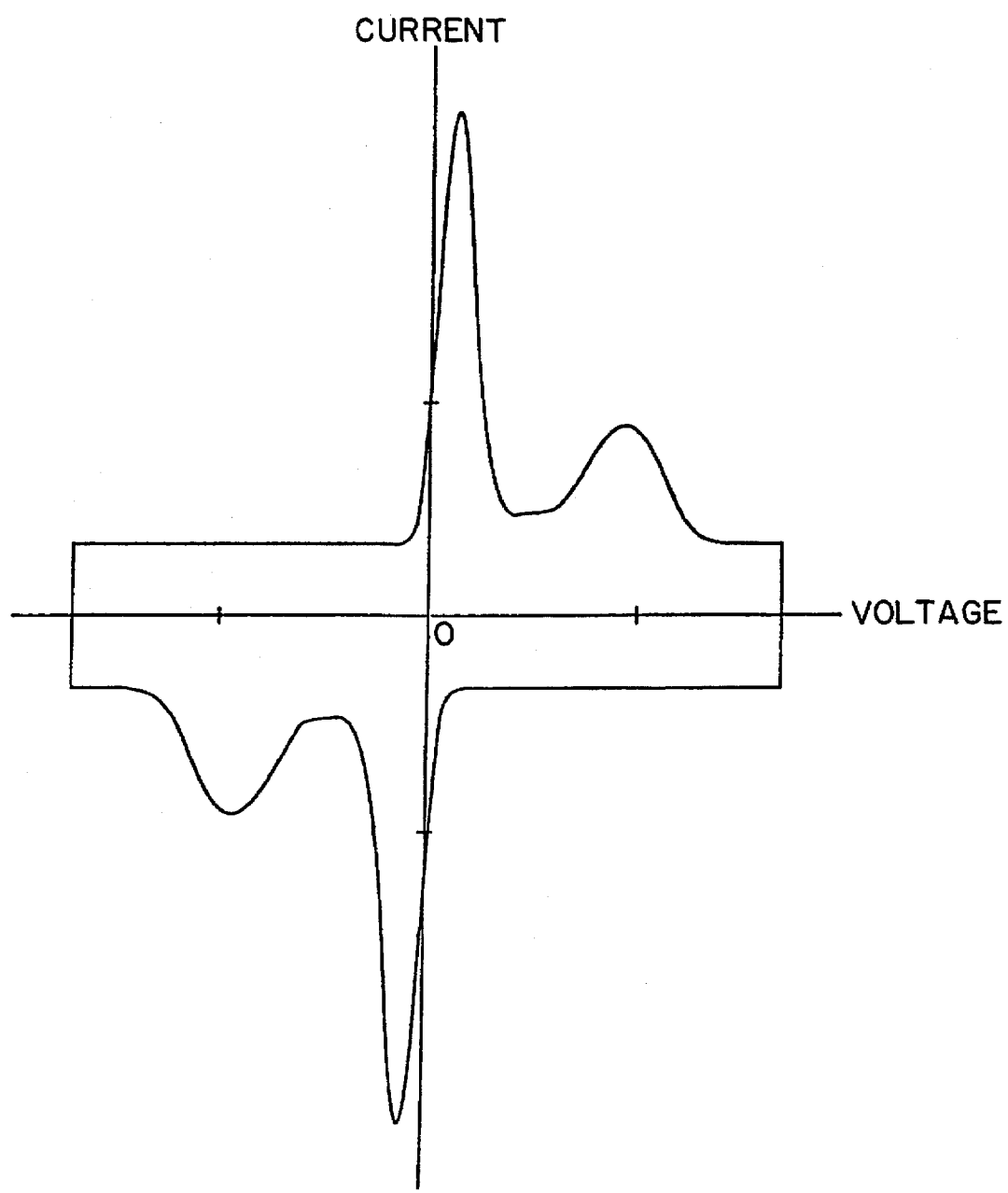
FIG. 17 shows current-voltage characteristics of a liquid crystal electrooptical device according to a comparison example for Embodiment 7.

For comparison, in the present embodiment, without mixing the resin material into the liquid crystal material, the cell was produced. The liquid crystal had a uniaxial orientation along the rubbing direction to show a good optical quenching level. However, when the current-voltage characteristics were measured, the Ps peak and the second peak were observed as shown in FIG. 17.

In the case where a pulse of 1 μsec and 15 V was applied to this device at every one second and the device was driven, the optical characteristics thereof were shown in FIG. 18. Although the liquid crystal molecules were reversed into the dark condition by the application of the voltage, this condition change was gentle. The dark condition was not sufficiently stabilized.

Also, if the device was used in an upright condition, the liquid crystal material was stagnant in the lower portion of the substrates so that the substrate space distance was increased locally at some parts. Also, if the parts would be pushed by the operator's fingers, the substrate space distance would be reduced. At the same time, the layer structure of the liquid crystal was damaged and there was non-uniformity in display.

Embodiment 8

An embodiment in which a TN type operational mode is used in the device according to the present invention will now be described.

Indium tin oxides (hereinafter referred to ITOs) were deposited on a pair of glass substrates of 10 cm² into a film thickness in the range of 500 to 2,000 Å by a sputtering method or a deposition method. In this embodiment, the ITOs were deposited to a film thickness of 1,000 Å and were patterned by a regular photolithographic step. On the substrates, SE-610 or SE-4110 (the latter was used in this embodiment) made by Nissan Chemical Co. was deposited, by an offset printing technique using a stripe coater. It is preferable to set the baking temperature in the range of 200° to 300° C. In this embodiment, the baking temperature was 280° C. for forming the orientation film. It is preferable to set the film thickness in the range 600 to 1,000 Å. In this embodiment, the film thickness was 800 Å. The two substrates were subjected to the rubbing treatment so that an angle of the rubbing directions of the upper and lower confronting substrates was 90° when the substrates were aligned with the electrode surfaces thereof facing each other. Furthermore, spacers made of silica and having a diameter of 6.5 μm were sprayed over one of the substrate, and the seal printing was applied to the other substrate by a screen printing to provide the TN cell.

As the liquid crystal material which was used, the resin material which was the ultraviolet ray curing type resin was used by 5% relative to 95% cyanobiphenyl system nematic liquid crystal whose dielectric anisotropy was positive. In order to better mix the resin into the liquid crystal, the liquid crystal was heated at a temperature of 90° and agitated so that the liquid crystal exhibited the isotropic phase. The liquid crystal was injected into the cell, and after the gradually cooling step, the resin was cured.

The voltage to be applied to the liquid crystal layer was abruptly changed when the voltage of 10 V was applied to the completed liquid crystal electrooptical device. There was no change based upon the lapse of time. Also, if the device was used in an upright condition, the substrate space distance was not increased by the adhesive polymerized column spacers and kept constant. Also, there was no non-uniformity in display.

In the thus produced liquid crystal electrooptical device, there was no display non-uniformity, flickering or the like. Thus, it was possible to provide the device having an extremely high performance and stable optical characteristics. Also, an active matrix type liquid crystal electrooptical device in which a plurality of pixel electrodes and thin film transistors for connecting with the plurality of pixel electrodes were formed on the inner surface of one of the substrate was produced while the liquid crystal mixture according to the embodiment was filled in the cell. It was therefore possible to provide the device which was of a high speed type and had a high contrast ratio.

In comparison, in the present embodiment, without mixing the resin material into the liquid crystal material, the cell was produced. The voltage between the electrodes (i.e., the liquid crystal layer distance) was largely changed on the time basis and the optical characteristics were changed in accordance with the change of the voltage on the time basis when the voltage of 10 V was applied to the liquid crystal electrooptical device.

Embodiment 9

Embodiments 9 to 12 show examples in which the reaction initiator was mixed into the liquid crystal material. The case in which the liquid crystal electrooptical device of the present invention uses a ferroelectric liquid crystal is described below.

Indium tin oxide (ITO) for the electrode material wa formed on a glass substrate of 10 cm square by sputtering or evaporation to a thickness of 500 to 2,000 Å, 1000 Å in the Embodiment 9, and patterned by ordinary photolithography process. A polyimide was applied on the substrate by spin coating, and baked at 280° C. RN-305 manufactured by Nissan Chemical Co. or LP-64 manufactured by Tory Co. was used as the polyimide. Thickness of the polyimide film is 100 to 800 Å, 150 Å in the Embodiment 9. The substrate was subject to rubbing treatment to perform a uniaxial orientation treatment. Shinshikyu spacers made of silica particles by Catalyst Kasei Co. was dispersed on one of the substrates. Epoxy resin was screen printed as a sealant on the other of the substrates. Both the substrates were mated with a distance between the electrodes being about 1.5 μm to form a cell.

The material used in the embodiment was ferroelectric liquid crystal CS1014 made by Chisso Co. The Ps (spontaneous polarization) of the liquid crystal was 5.4 nC/cm². Its phase system row was I (isotropic phase)-N (nematic phase)-A (smectic A phase)-C* (smectic C* phase). Also, the reaction initiator was Irgercure 369 made by Ciba Geigy Co. which had a high reactivity of the well known initiators and by which the effect of the invention was most effectively attained.

The reaction initiator was mixed into the liquid crystal by 1 to 3% (3% in the embodiment). In order to much more mix the added initiator into the liquid crystal, the mixture was heated and agitated so that the liquid crystal would exhibit the isotropic phase at 100° C. Thus, the reaction initiator was uniformly mixed into the liquid crystal (The mixture will be hereinafter referred to as liquid crystal mixture).

The cell and the liquid mixture were heated up to 100° C. and were injected into the cell under the vacuum condition. Thereafter, the mixture was gradually cooled down to a room temperature at a rate of 2° to 20° C./hr (2° C./hr in the embodiment). When the orientation condition was observed through a polarizing microscope at the room temperature after the gradual cooling, the liquid crystal exhibited the uniaxial orientation along the rubbing direction and the good optical quenching level like the liquid crystal material to which the reaction initiator was not added.

Figure 19:
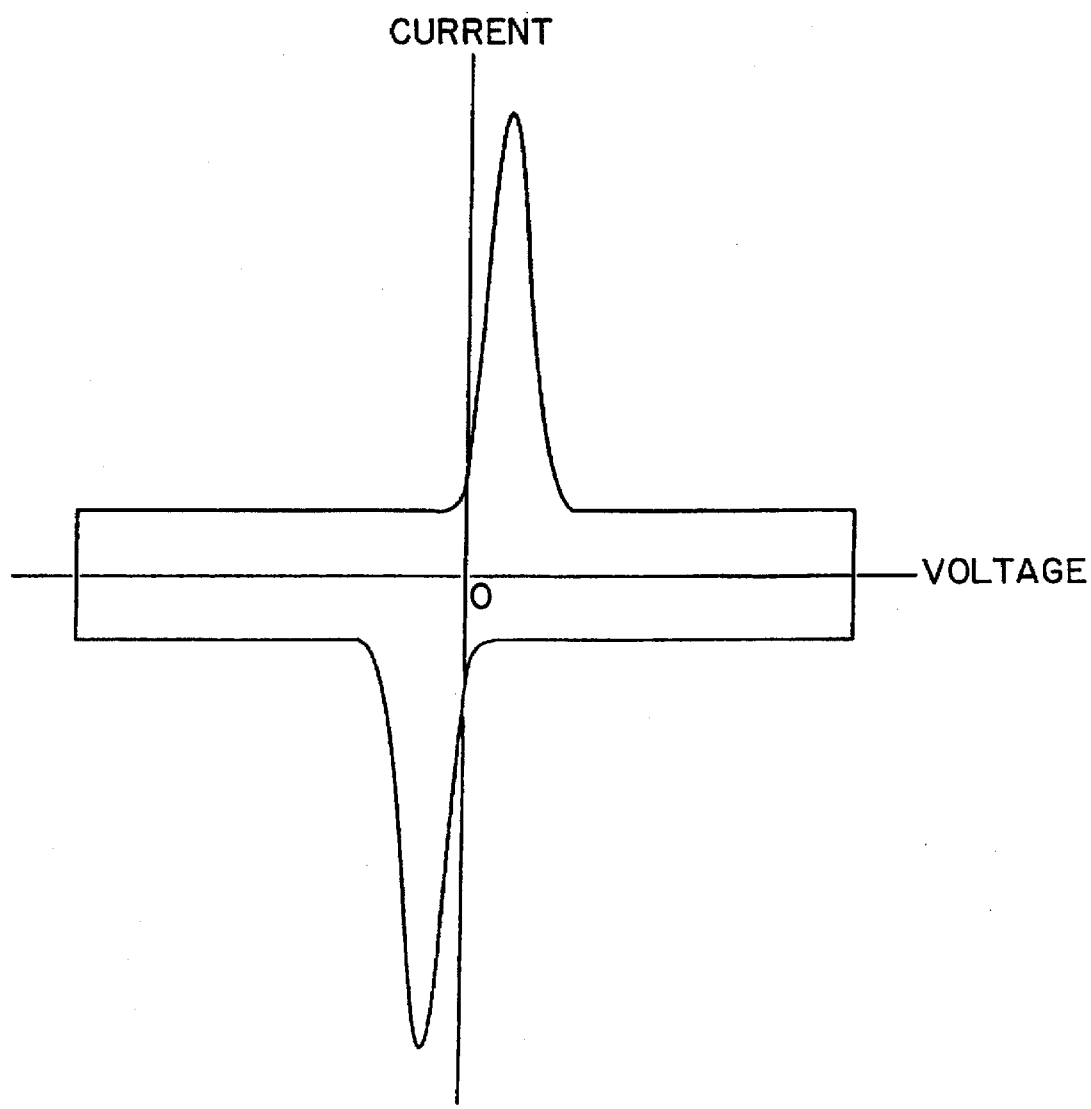
FIG. 19 shows current-voltage characteristics obtained according to Embodiments 9 and 10.

When a triangular wave of ±20 V and 5 Hz was applied between the electrodes of the liquid crystal electrooptical device so that the voltage to be applied was continuously changed, the measurement of the current-voltage characteristics was carried out. As a result, the reversal of the spontaneous polarization of the liquid crystal molecules through 180°, i.e., the reversed peak (hereinafter referred to as a Ps peak) was observed as shown in FIG. 19 (shown in any desired unit).

Figure 20A:
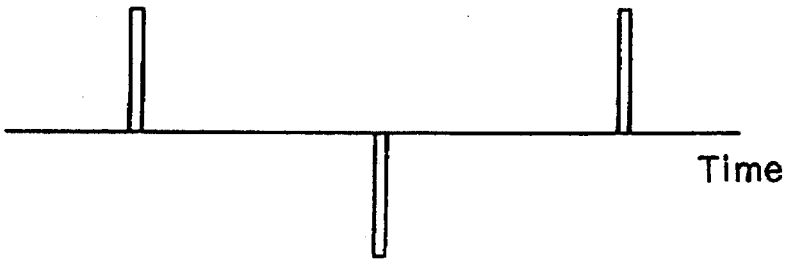
FIG. 20 shows optical characteristics in the case where a pulse voltage is applied to a liquid crystal electrooptical device according to Embodiments 9 and 10 after the projection of ultraviolet rays.
Figure 20B:
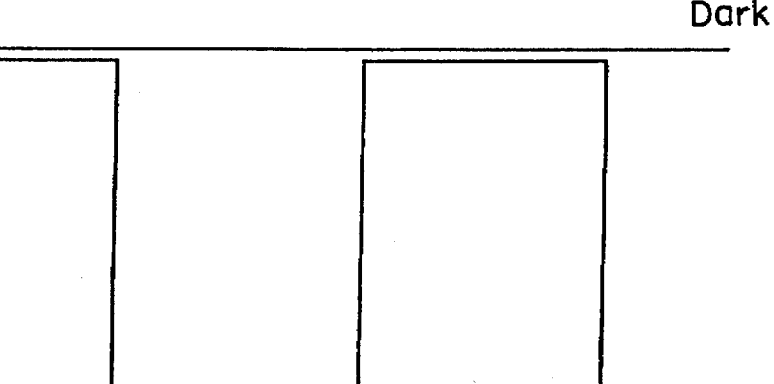
Figure 20C:
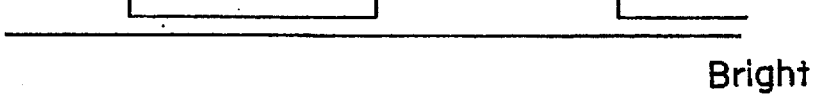

The optical characteristics are shown in FIG. 20 in the case where a pulse of 1 μsec and 15 V was applied to the device at every one second. As was apparent from FIG. 20, a sharp bright-dark state reversal was generated upon the voltage application above the Ps peak voltage. It was apparent that the sharp bright-dark condition occurred and the condition thereof was stable.

Embodiment 10

The structure of the device and the used liquid crystal and reaction initiator of this embodiment were the same as those of Embodiment 1. The amount of addition of the reaction initiator in this embodiment was 1% in the liquid crystal material. In the same way as in Embodiment 9, in order to much more mix the initiator into the liquid crystal, the mixture was heated and agitated so that the liquid crystal would exhibit the isotropic phase at 100° C. Thus, the reaction initiator was uniformly mixed into the liquid crystal to provide the liquid mixture.

The cell and the liquid crystal mixture were heated up to 100° C. and were injected into the cell under the vacuum condition. Thereafter, the mixture was gradually cooled down to a room temperature at a rate of 2° to 20° C./hr (2° C./hr in this embodiment as in Embodiment 9). When the orientation condition was observed through a polarizing microscope at the room temperature after the gradual cooling, the liquid crystal exhibited the uniaxial orientation along the rubbing direction and the good optical quenching level like the liquid crystal material to which the reaction starter was not added.

In the same way as in Embodiment 9, when a triangular wave of ±20 V and 5 Hz was applied between the electrodes of the liquid crystal electrooptical device, the measurement of the current-voltage characteristics was carried out. As a result, in the same way as in Embodiment 9, only the Ps peak was observed.

Figure 21A:
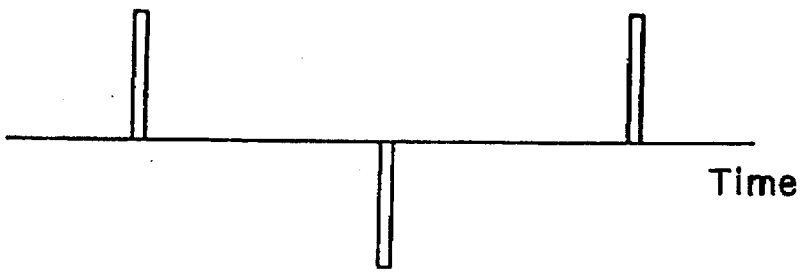
FIG. 21 shows optical characteristics in the case where a pulse voltage is applied to a liquid crystal electrooptical device according to Embodiment 10 before the projection of ultraviolet rays.
Figures 21B, 21C:
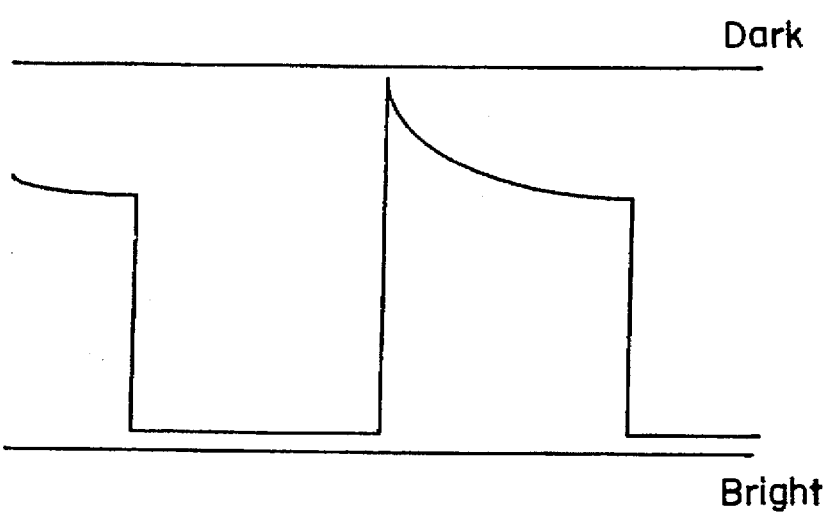

The optical characteristics are shown in FIG. 21 in the case where a pulse of 1 μsec and 15 V was applied to the device at every one second. As was apparent from FIG. 21, a sharp bright-dark state reversal was generated upon the voltage application above the Ps peak voltage and once the dark condition was exhibited. However, this condition was changed to the bright condition in the lapse of time.

An ultraviolet ray was projected for further supplying charge from the reaction initiator. In this case, the projection intensity was 20 mW/cm$^2$ and the projection time was one minute. In the same manner as in the condition before the projection of the ultraviolet ray, only the Ps peak was confirmed through the observation of the current-voltage characteristics. With respect to the optical characteristics, the abrupt bright-dark reversal occurred in the same manner as in Embodiment 1 and its condition was not changed on the time basis and stable.

Embodiment 11

An example where the present invention was applied to the liquid crystal electrooptical device using the ferroelectric liquid crystal is described.

The liquid crystal material used in the embodiment was biphenyl system material which was ferroelectric liquid crystal. The Ps of the liquid crystal was 10.9 nC/cm$^2$. Its phase system row was I (isotropic phase)-A (smectic A phase)-C* (smectic C* phase). Also, the reaction initiator was Irgercure 184 made by Ciba Geigy Co. The amount of addition thereof was 1% to the liquid crystal material.

In order to much more mix the added initiator into the liquid crystal, the mixture was heated and agitated so that the liquid crystal would exhibit the isotropic phase at 120° C. Thus, the reaction initiator was uniformly mixed into the liquid crystal to provide liquid crystal mixture.

The same cell as that of Embodiment 9 was prepared. The cell and the liquid mixture were heated up to 120° C. and were injected into the cell under the vacuum condition. Thereafter, the mixture was gradually cooled down to a room temperature at a rate of 2° to 20° C./hr (2° C./hr in the embodiment). When the orientation condition was observed through a polarizing microscope at the room temperature after the gradual cooling, the liquid crystal exhibited the uniaxial orientation along the rubbing direction and the good optical quenching level like the liquid crystal material to which the reaction initiator was not added.

In the liquid crystal optical device, when a triangular wave of ±20 V and 5 Hz was applied between the electrodes of the device, the measurement of the current-voltage characteristics was carried out. As a result, in the same way as in foregoing embodiments, only the Ps peak was observed.

Figure 22A:
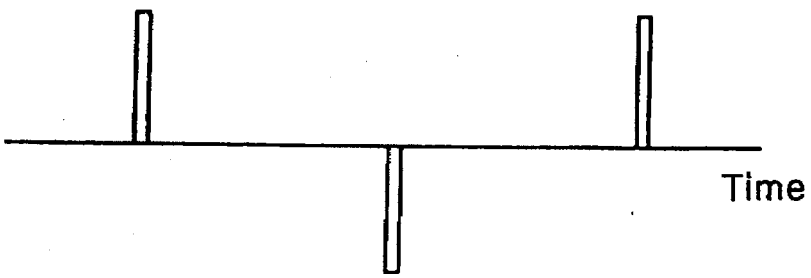
FIG. 22 shows optical characteristics in the case where a pulse voltage is applied to a liquid crystal electrooptical device according to Embodiment 11 before the projection of ultraviolet rays.
Figure 22B:
Figure 22C:
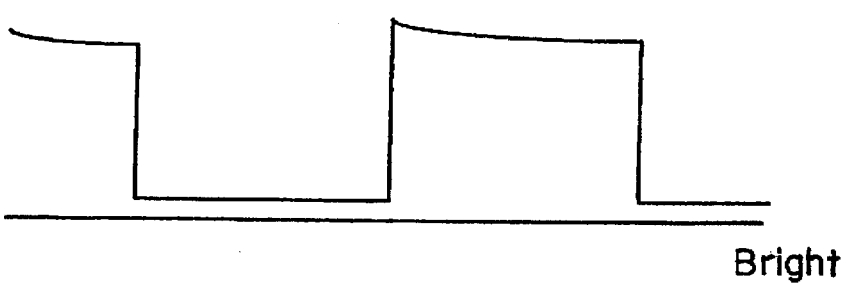

The optical characteristics are shown in FIG. 22 in the case where a pulse of 1 μsec and 15 V was applied to the device at every one second. A sharp bright-dark condition was changed to the dark condition upon the voltage application but the dark condition was changed toward the bright condition in the lapse of time. This dark condition was not so good.

An ultraviolet ray was projected for further supplying charge from the reaction initiator. In this case, the projection intensity was 20 mW/cm$^2$ and the projection time was one minute. In the same manner as in the condition before the projection of the ultraviolet ray, only the Ps peak was confirmed through the observation of the current-voltage characteristics.

Figure 23A:
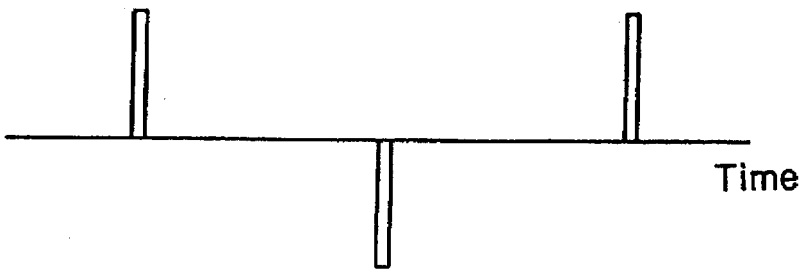
FIG. 23 shows optical characteristics in the case where a pulse voltage is applied to a liquid crystal electrooptical device according to Embodiment 11 after the projection of ultraviolet rays.
Figure 23B:
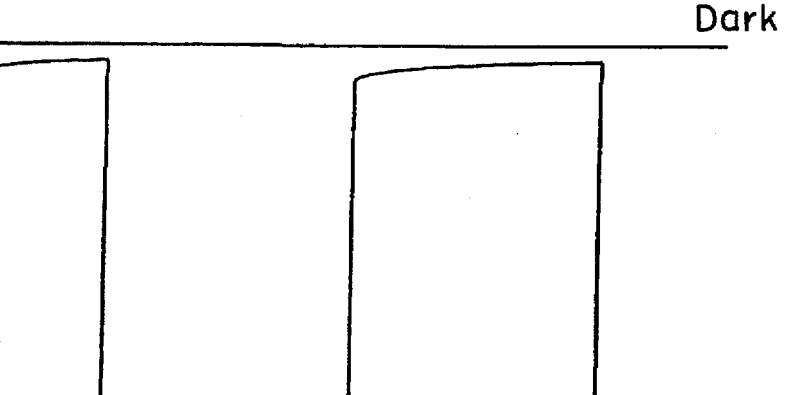
Figure 23C:
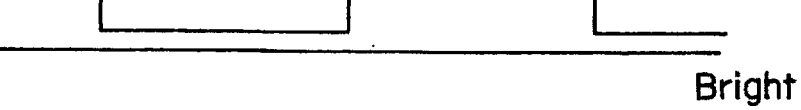
Figure 24:
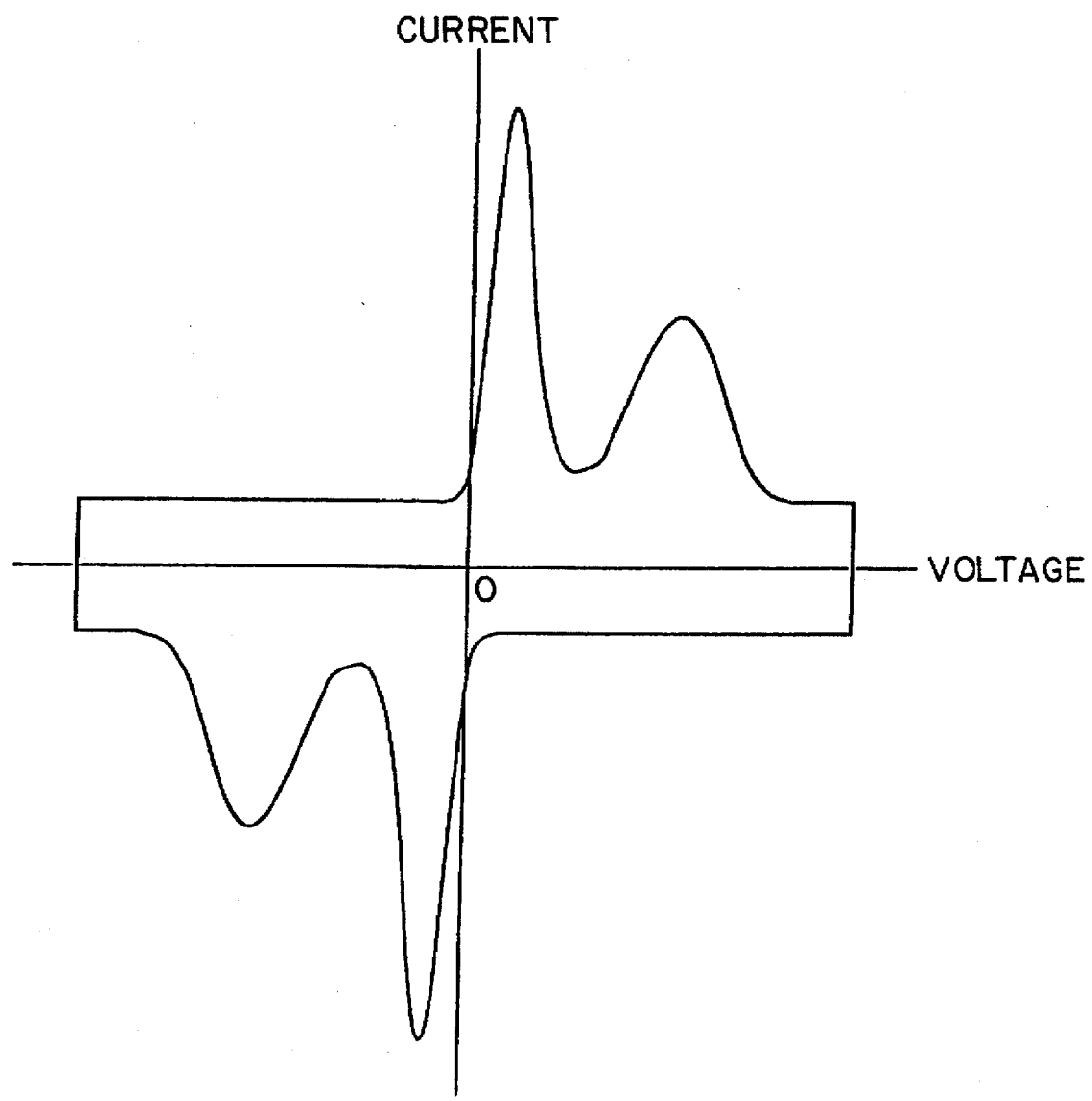
FIG. 24 shows current-voltage characteristics of comparison examples 1 and 2.

The optical characteristics are shown in FIG. 23 in the case where a pulse of 1 μsec and 15 V was applied to the device at every one second. A sharp bright-dark condition was changed to the dark condition upon the voltage application. The optical characteristic, in particular, the dark condition was better. This condition was stable.

Embodiment 12

An embodiment in which the invention is applied to a TN type operational mode as the liquid crystal mode will be explained.

Indium tin oxides (hereinafter referred to ITOs) were deposited on a pair of glass substrates of 10 cm$^2$ into a film thickness in the range of 500 to 2,000 Å by a sputtering method or a deposition method. In this embodiment, the ITOs were deposited to a film thickness of 1,000 Å and were patterned by a regular photolithographic step. On the substrates, SE-610 or SE-4110 made by Nissan Chemical Co. was deposited, by an offset printing technique using a stripe coater. It is preferable to set the baking temperature in the range of 200° to 300° C. In this embodiment, the baking temperature was 280° C. for forming the orientation film. It is preferable to set the film thickness in the range 600 to 1,000 Å. In this embodiment, the film thickness was 800 Å. The two substrates were subjected to the rubbing treatment so that an angle of the rubbing directions of the upper and lower confronting substrates was 90° when the substrates were aligned with the electrode surfaces thereof facing each other. Furthermore, silica particles having a diameter of 6.5 µm were sprayed over one of the substrate, and the seal printing was applied to the other substrate by a screen printing to provide the TN cell.

As the liquid crystal material which was used, the resin material which was the ultraviolet ray curing type resin was used by 5% relative to 95% cyanobiphenyl system nematic liquid crystal whose dielectric anisotropy was positive. Irgercure 369 was added by 3% to the liquid crystal as the reaction initiator. In order to better mix the resin into the liquid crystal, the liquid crystal was heated at a temperature of 90° and agitated so that the liquid crystal exhibited the isotropic phase. The liquid crystal was injected into the cell, so that the reaction initiator was uniformly mixed into the liquid crystal to provide liquid mixture. The mixture was injected into the cell.

The voltage to be applied to the bright condition was sharply changed when the voltage of 10 V was applied to this liquid crystal electrooptical device. This was because the reaction initiator was added to the liquid crystal to there by remove the undesired charge in the liquid crystal layer. The optical characteristics were changed abruptly from the dark condition to the bright condition in accordance with the change of the voltage. There was no aging (change on the time basis).

Embodiment 13

An embodiment in which an STN type liquid crystal is used as the liquid crystal material will be described.

Indium tin oxides (hereinafter referred to ITOs) which were the electrode material were deposited on glass substrates of 10 cm$^2$ into a film thickness in the range of 500 to 2,000 Å by a sputtering method or a deposition method. In this embodiment, the ITOs were deposited to a film thickness of 1,000 Å and were patterned by a regular photolithographic step. On the substrates, SE-610 or SE-4110 made by Nissan Chemical Co. was deposited, by an offset printing technique using a stripe coater, as the orientation film. It is preferable to set the baking temperature in the range of 200° to 300° C. In this embodiment, the baking temperature was 280° C. It is preferable to set the film thickness in the range 600 to 1,000 Å. In this embodiment, the film thickness was 800 Å. The two substrates were subjected to the rubbing treatment so that an angle of the rubbing directions of the upper and lower confronting substrates was 240°. Furthermore, silica particles having a diameter of 6.5 µm were sprayed over one of the substrate, and the seal printing was applied to the other substrate to form the liquid crystal cell. A polarizing plate and a chromatic compensation plate were combined with the liquid crystal cell to form the STN cell.

ZLI-2293 made by Merck Co. was used as the liquid crystal material, S-811 was added as a chiral agent at 0.1 to 3%, 0.12% in the Embodiment 13 to adjust the pitch. A ratio of the cell thickness to the pitch was 0.50 to 0.55. Irgercure 369 was added to the liquid crystal material as the reaction initiator at 3%. In order to much more mix the added reaction initiator into the liquid crystal, the reaction initiator added liquid crystal material was heated and agitated at 90° C. so that the liquid crystal exhibited isotropic phase. The reaction initiator was thus mixed uniformly into the liquid crystal. The liquid crystal mixture was thus obtained and injected into the foregoing cell.

When the voltage of 10 V was applied to the liquid crystal electrooptical device, the voltage applied to the liquid crystal layer was abruptly changed and then was not changed through the lapse of time. This is because the undesired electric charge had been eliminated in the liquid crystal layer by virtue of the reaction initiator added in the liquid crystal. The contrast was 15 when the cell was driven at a duty of 200, which was the same contrast as that of the conventional device which did not contain any reaction initiator.

Comparison Example 1

The device structure and the liquid crystal material used in the Comparison Example 1 was the same as those of the Embodiment 9 and 10. However, the liquid crystal material of the Comparison Example 1 did not contain any reaction initiator.

The cell and the liquid crystal material were heated at 100° C. The liquid crystal material was injected into the cell under vacuum and then gradually cooled to room temperature at a rate of 2° to 20° C./hr, 2° C./hr in the Comparison Example 1. When the orientation condition after the gradual cooling was observed at room temperature by polarization microscope, the liquid crystal exhibited an uniaxial orientation along the rubbing direction and a good optical quenching level.

When the current-voltage characteristic of this liquid crystal electrooptical device was measured, the $P_s$ peak and the change (referred to as the second peak hereinafter) of current attributable to the movement of the electric charge in the device were measured. Usually, this second peak exists adjacent to the $P_s$ peak. Therefore, it is difficult to determine the voltage applied during the device driving.

The optical characteristic obtained when a pulse of 15 V and 1 µsec was applied every one second to drive this device is shown in FIG. 25. The liquid crystal molecule was reversed upon the voltage application to become a dark condition. This dark condition was changed toward the bright condition in accordance with the lapse of time and again toward the dark condition thereafter in an unstable manner.

Comparison Example 2

In this comparison example, the same structure of the device and the same liquid crystal material as those of Embodiment 11 were used.

However, in this comparison example, the reaction initiator was not added to the liquid crystal material.

In the same manner as in Embodiment 11, the liquid crystal was injected into the cell under the vacuum condition. When the current-voltage characteristics of the liquid crystal electrooptical device were measured, the Ps peak and the second peak were observed in the same manner in comparison example 1.

The optical characteristics are shown in FIG. 26 in the case where a pulse of 1 µsec and 15 V was applied to the device at every one second. A sharp bright-dark condition was changed to the dark condition upon the voltage application. The bright-dark condition was reversed by the application of the voltage but the condition change was gentle.

Comparison Example 3

In this comparison example, also, the same structure of the device and the same liquid crystal material as those of Embodiment 12 were used.

However, in this comparison example, the reaction initiator was not added to the liquid crystal material. Such liquid crystal was injected in the same way as in Example 12.

When the voltage of 10 V was applied to the liquid crystal electrooptical device, the voltage applied to the liquid crystal layer was changed through the lapse of time, and the optical characteristics were also changed in accordance with the time basis change.

Embodiment 14

An embodiment in which the liquid crystal material was again orientated after curing of the resin will be explained.

Indium tin oxides (hereinafter referred to ITOs) which were the electrode material were deposited on glass substrates of 10 cm$^2$ into a film thickness in the range of 500 to 2,000 Å by a sputtering method or a deposition method. In this embodiment, the ITOs were deposited to a film thickness of 1,000 Å and were patterned by a regular photolithographic step. Polyimides were coated on these substrates by a spin coating method and were baked at a temperature of 280° C. The polyimides were LP-64 made by Toray Co. and RN-305 made of Nissan Chemical Co. The thickness thereof was in the range of 100 to 800 Å, and in the example, was 150 Å. These substrates were subjected to a rubbing treatment for a uniaxial orientation treatment. Shinshikyu spacers made of silica particles by Catalyst Kasei Co. were sprayed on one of the substrates and sealants made of epoxy resin were formed on the other substrate by a screen printing method. Both the substrates were cemented at a distance of an electrode interval of 1.5 μm to form a cell.

The material used in the embodiment was ferroelectric liquid crystal CS1014 made by Chisso Co. The Ps of the liquid crystal was 5.4 nC/cm$^2$. Its phase system row was I (isotropic phase)-N (nematic phase)-A (smectic A phase)-C* (smectic C* phase).

The resin material used in the embodiment was a mixture of urethane system oligomer and an acrylic monomer which were available on the market.

The 95% liquid crystal material and the 5% non-cured resin material (by weight percentage) were mixed together. In order to much more mix the added resin into the liquid crystal, the mixture was heated and agitated so that the liquid crystal would exhibit the isotropic phase at 90° C. The mixture will be referred to as liquid crystal mixture.

The cell and the liquid crystal mixture were heated up to 90° C. and were injected into the cell under the vacuum condition. Thereafter, the mixture was gradually cooled down to a room temperature at a rate of 2° to 20° C./hr (2° C./hr in the embodiment). When the orientation condition was observed through a polarizing microscope at the room temperature after the gradual cooling, the resin material was present in spot manner in the cell and the liquid crystal exhibited the uniaxial orientation along the rubbing direction and the good optical quenching level like the liquid crystal material to which the resin was not added.

An ultraviolet ray was projected with the projection intensity being at 3 to 300 mW/cm$^2$ and the projection time being 0.5 to 5 minutes. (In this embodiment, the intensity was 20 mW/cm$^2$ and the projection time was one minute). After the projection of the ultraviolet ray, the liquid crystal exhibited the uniaxial orientation along the rubbing direction and ensured the good optical quenching level.

A triangular wave of ±30 V was applied to the cell and the optical characteristics were measured. If the operational condition was carefully observed, it was understood that a minute amount of light was leaked from the periphery of the resin upon the dark condition display. In this case, the bright condition was expressed by 35.26 (in any desired unit), the dark condition was expressed by 1.131, the contrast was 31.16, and the measured voltage holding rate was 45.0% when a pulse of ±20 V and 60 μm was applied to the cell. If the cell was observed after aging, the bright condition was 40.08, the dark condition was 0.924, the contrast 43.39 and the measured voltage holding rate was 49.0% to considerably improve the actual characteristics.

Embodiment 15

An embodiment in which the liquid crystal material was again orientated after curing of the resin will be explained.

In this embodiment, the same structure of the device, the same liquid material and the resin material as those in Example 13 were used.

The 85% liquid crystal material and the 15% non-cured resin material (by weight percentage) were mixed together. In order to much more mix the added resin into the liquid crystal, the mixture was heated and agitated so that the liquid crystal would exhibit the isotropic phase at 90° C.

The cell and the liquid mixture were heated up to 90° C. and were injected into the cell under the vacuum condition. Thereafter, the mixture was gradually cooled down to a room temperature at a rate of 2° to 20° C./hr (2° C./hr in the embodiment). When the orientation condition was observed through a polarizing microscope at the room temperature after the gradual cooling, the resin material was present in spot manner in the cell and the liquid crystal exhibited the uniaxial orientation along the rubbing direction and the good optical quenching level like the liquid crystal material to which the resin was not added.

An ultraviolet ray was projected with the projection intensity being at 3 to 30 mW/cm$^2$ and the projection time being 0.5 to 5 minutes. (In this embodiment, the intensity was 20 mW/cm$^2$ and the projection time was one minute). After the projection of the ultraviolet ray, the liquid crystal exhibited the uniaxial orientation along the rubbing direction and ensured the good optical quenching level.

A triangular wave of ±30 V was applied to the cell and the optical characteristics were measured. If the operational condition was carefully observed, it was understood that a minute amount of light was leaked from the periphery of the resin upon the dark condition display. In this case, the bright condition was expressed by 22.89 (in any desired unit), the dark condition was expressed by 3.491, the contrast was 6.6, and the measured voltage holding rate was 61.0% when a pulse of ±20 V and 60 μm was applied to the cell. If the cell was observed after aging, the bright condition was 31.48, the dark condition was 3.162, the contrast 10 and the measured voltage holding rate was 71.0% to considerably improve the actual characteristics.

Embodiment 16

An embodiment in which the sealant and the non-cured material are simultaneously cured will be explained.

The material used in the embodiment was ferroelectric liquid crystal CS1014 made by Chisso Co. The Ps of the liquid crystal was 5.4 nC/cm$^2$. Its phase system row was I (isotropic phase)-N (nematic phase)-A (smectic A phase)-C* (smectic C* phase).

In this embodiment, the resin material used in the embodiment was a mixture of urethane system oligomer and an acrylic monomer which were available on the market.

The 95% liquid crystal material and the 5% non-cured resin material were mixed together. In order to much more mix the added resin into the liquid crystal, the mixture was heated and agitated so that the liquid crystal would exhibit the isotropic phase at 90° C. The mixture will be referred to as liquid crystal mixture.

Indium tin oxides (hereinafter referred to ITOs) which were the electrode material were deposited on glass substrates of 10 cm$^2$ into a film thickness in the range of 500 to 2,000 Å by a sputtering method or a deposition method. In this embodiment, the ITOs were deposited to a film thickness of 1,000 Å and were patterned by a regular photolithographic step. Polyimides were coated on these substrates by a spin coating method and were baked at a temperature of 280° C. The polyimides were LP-64 made by Toray Co. and RN-305 made of Nissan Chemical Co. The thickness thereof was in the range of 100 to 800 Å, and in the example, was 150 Å. These substrates were subjected to a rubbing treatment for a uniaxial orientation treatment. Shinshikyu spacers made of silica particles were sprayed on one of the substrates and sealants made of ultraviolet ray curing type resin were formed on the other substrate by a screen printing method.

By warming the two substrates above the transition point of the liquid crystal mixture, a suitable amount of isotropic phase liquid crystal mixture was dropped on the screen-printed substrate. The substrates on which the spacers were sprayed were pressed from above with the liquid crystal mixture being clamped by the substrates. Thus, the cell having a substrate space interval of 1.5 µm was prepared. The cell was cooled down to a room temperature and the liquid crystal material and the non-cured resin were separated. Then, the liquid crystal could be observed under the polarizing microscope. The liquid crystal exhibited a uniaxial orientation along the rubbing direction of the orientation film in the same manner as in the liquid crystal material to which no resin was added. Then a good optical quenching level was obtained. The resin was observed to be dispersed in a spot manner.

Subsequently, an ultraviolet ray was projected on the entire surface of the cell including the sealed portion with the projection intensity being at 3 to 30 mW/cm$^2$ and the projection time being 0.5 to 5 minutes to thereby cure the resin which was present in the display portion and the seal portion in a spot manner. (In this embodiment, the intensity was 20 mW/cm$^2$ and the projection time was one minute). After the projection of the ultraviolet ray, the liquid crystal exhibited the uniaxial orientation along the rubbing direction and ensured the good optical quenching level.

Embodiment 17

An embodiment in which the resin is cured by the heat and the ultraviolet ray will be explained.

On a substrate of 10 cm$^2$, there were formed TFTs (Thin Film Transistors) and pixel electrodes, signal electrodes, scanning electrodes and so on connected TFTs and made of ITO's (Indium Tin Oxides) as switching elements.

The ITO's were formed on the other confronting electrode. A light shielding film made of Cr or Al or oxide film thereof was provided on the ITO's each confronting the TFTs with one substrate confronting with the other substrate having the TFTs. Polyimide was applied on the substrates by using a spin coating method and was baked to form an orientation film. The substrates were subjected to the rubbing treatment for the uniaxial orientation.

Spacers were sprayed on one substrate and the sealant made of epoxy resin was formed through the screen printing on the other substrate. The two substrates are cemented to each other at an interval of about 3 µm to form a cell.

The material used in the embodiment was ferroelectric liquid crystal CS1014 made by Chisso Co. The Ps of the liquid crystal was 5.4 nC/cm$^2$. Its phase system row was I (isotropic phase)-N (nematic phase)-A (smectic A phase)-C* (smectic C* phase).

The resin material used in this embodiment was acrylic transforming epoxy resin which was available on the market. The material was cured by the ultraviolet rays and was completely cured by the heat. In this case, it is preferable that the resin curing temperature is higher than a temperature at which the liquid crystal exhibits the isotropic phase.

The above-described materials were mixed with the liquid crystal of 95% and the non-cured resin of 5% by wt %. The mixture will be hereinafter referred to as liquid crystal mixture.

The cell and the liquid crystal mixture were heated up to 90°, and the mixture was injected into the cell under the vacuum condition. Thereafter, the mixture was cooled down to the room temperature. When the orientation condition of the cell was observed through a polarizing microscope at the room temperature after the cooling, the resin material was diffused in the cell. The liquid crystal exhibited a uniaxial orientation along the rubbing direction of the orientation film in the same manner as in the liquid crystal material to which no resin was added. Then a good optical quenching level was obtained.

The ultraviolet ray was projected on the cell with the intensity being at 3 to 30 mW/cm$^2$ and the projection time being 0.5 to 5 minutes to thereby cure the resin. (In this embodiment, the intensity was 20 mW/cm$^2$ and the projection time was one minute). Furthermore, the cell was heated for 2.5 hours in the oven kept at 160° C. to completely cure the resin.

After the curing of the resin by the ultraviolet rays and the complete curing of the resin by heat, it was observed that the resin material was diffused, the liquid crystal exhibited a uniaxial orientation along the rubbing direction of the orientation film and a good optical quenching level was obtained.

When the optical characteristics of the cell were measured, it was possible to ensure sufficient characteristics as the electrooptical device with the contrast ratio of 100.

Next, the substrate of the cell was peeled, and the liquid crystal was cleaned and removed by alcohol. Then, the left condition of the resin cured in the column shape was observed by an SEM. In the same way as in the observation through the optical microscope, the resin was observed as the columns diffused in the spot manner on the substrate and the element portions were observed as the like columns diffused in the spot manner.

The cell was produced under the same conditions except for the heat curing and the resin on the substrate was observed through the SEM. The resin could be observed as the resin cured in the column shape in almost all the area on the substrate. Slight footprints of the resin were observed but the resin cured in the columns could not be found out in the element portion and the confronting portion.

As described above, by using the resin according to the present invention, it is possible to bond the upper and lower substrates in the column manner. It is therefore possible to positively keep a substrate space distance, which is difficult in particular, in a large area liquid crystal electrooptical device in the conventional technique. It is also possible to suppress the generation of the damage of the layer structure of the liquid crystal and non-uniformity in display. The device may be used in the upright condition.

Also, according to the present invention, by adding the non-cured resin material, i.e., the resin forming material and the reaction starter such as monomer or oligomer into the liquid crystal material, it is possible to positively cancel the charge held within the interior of the device, which is a problem in the conventional liquid crystal electrooptical device. As a result, it is possible to exclude unstable factors for the condition of the liquid molecules by the undesired charge and, to ensure the stable optical characteristics.

It is thus possible to provide a high performance liquid crystal electrooptical device which does not suffer from problems such as flickering in display of the device, aging of gradation or tone, non-uniformity in display. In particular, in a liquid crystal electrooptical device using a ferroelectric liquid crystal, in case of a simple matrix type one, the memory property is enhanced, the high contrast is obtained and the operational speed is enhanced. In case of an active matrix type one, in particular, a TFT drive time one, the high contrast may be obtained and the high operational speed may be obtained. Also in a liquid crystal electrooptical device using a nematic liquid crystal, it is possible to improve the contrast ratio or display condition.

Also, in case of only addition of the reaction initiator without adding the resin forming material in the liquid crystal, it is possible to positively cancel the charge per se, presenting within the device, by the charge from the reaction initiator for canceling the extra condition change of the liquid crystal molecules by the charge within the device, which is a problem of the conventional liquid crystal electrooptical device. It is possible to stabilize the optical characteristics of the device and to provide a high performance liquid crystal electrooptical device in which the optical characteristics are stabilized and the time-sharing drive is possible without any flickering or tonal change.

Also, according to the present invention, since the extra charge to be canceled (which is a problem of the conventional device using the charge moving carrier) is not generated, it is possible to ensure the stability of the optical characteristics of the device for a long period of time. The invention is largely contributable to the stability of the characteristics for the liquid crystal electrooptical deice.

What is claimed is:

1. An electrooptical device comprising:
a pair of substrates having electrodes on surfaces thereof with said electrodes confronting each other inwardly; and
an electrooptical modulating layer comprising a liquid crystal material and interposed between said pair of substrates,
wherein said liquid crystal material contains an ultraviolet ray curable material and a liquid crystal selected from the group consisting of twisted nematic liquid crystal and super twisted nematic liquid crystal, and
wherein said ultraviolet ray curable material is cleaved by an ultraviolet ray, and traps an electric charge present in said electrooptical modulating layer during the cleavage of said ultraviolet ray curable material.

2. The device of claim 1 wherein said reaction initiator is added by 0.001 to 10 weight % in said liquid crystal material.

3. The device of claim 1 wherein said reaction initiator comprises an ultraviolet ray exciting cleavage type material.

4. The device of claim 1 wherein a thin film transistor is provided on one of said substrates.

5. The device of claim 1 wherein said liquid crystal material contains a chiral agent at 0.1 to 3 weight %.

6. The device of claim 1 wherein said ultraviolet ray curable material comprises a reaction initiator.

7. An electrooptical device comprising:
a pair of light permeable substrates having electrodes on surfaces thereof with said electrodes confronting each other inwardly;
an electrooptical modulating layer comprising a liquid crystal material and interposed between said pair of substrates;
orientation means interposed between said pair of substrates for orientating said liquid crystal material in a constant direction on an inside surface of at least one of said pair of substrates; and
a polymerized columnar spacer which is adhesively bonded to said orientation means and/or said substrates and is formed by precipitating and curing a non-cured resin which has been mixed into said liquid crystal material,
wherein said liquid crystal material comprises an ultraviolet ray curable material and a liquid crystal selected from the group consisting of twisted nematic liquid crystal and super twisted nematic liquid crystal, and
wherein said ultraviolet ray curable material is cleaved by an ultraviolet ray, and traps an electric charge present in said electrooptical modulating layer during the cleavage of said ultraviolet ray curable material.

8. The device of claim 7 wherein a rate of an area occupied by the cured resin in a display portion as viewed from a substrate surface of the electrooptical device is in the range of 0.1 to 20%.

9. The device of claim 7 wherein said non-cured resin comprises ultraviolet ray curing type resin.

10. The device of claim 7 wherein the resin comprises acrylic transforming epoxy resin.

11. The device of claim 7 wherein said liquid crystal material contains a chiral agent at 0.1 to 3 weight %.

12. The device of claim 7 wherein said ultraviolet ray curable material comprises a reaction initiator.

13. An electrooptical device comprising:
a pair of light permeable substrates having electrodes on surfaces thereof with said electrodes confronting each other inwardly;
an electrooptical modulating layer comprising a liquid crystal material and interposed between said pair of substrates;
orientation means interposed between said pair of substrates for orientating said liquid crystal material in a constant direction on an inside surface of at least one of said pair of substrates; and
a polymerized columnar spacer which is adhesively bonded to said orientation means and/or said substrates and is formed by precipitating and curing a non-cured resin which has been mixed into said liquid crystal material,
wherein a rate of an area occupied by the cured resin in a display portion as viewed from a substrate surface of the electrooptical device is in the range of 0.1 to 20%,
wherein said liquid crystal material comprises an ultraviolet ray curable material, and
wherein said ultraviolet ray curable material is cleaved by an ultraviolet ray, and traps an electric charge present in said electrooptical modulating layer during the cleavage of said ultraviolet ray curable material.

14. The device of claim 13 wherein said non-cured resin comprises ultraviolet ray curing type resin.

15. The device of claim 13 wherein the resin comprises acrylic transforming epoxy resin.

16. The device of claim 13 wherein said liquid crystal material contains a liquid crystal selected from the group consisting of twisted nematic liquid crystal and super twisted nematic liquid crystal.

17. The device of claim 16 wherein said liquid crystal material contains a chiral agent at 0.1 to 3 weight %.

18. The device of claim 13 wherein said ultraviolet ray curable material comprises a reaction initiator.

19. A method for forming an electrooptical device comprising the steps of:

filling a liquid crystal mixture of a liquid crystal material and an ultraviolet ray curable material in between a pair of confronting substrates having electrodes on inside surfaces thereof; and cleaving said ultraviolet ray curable material, and wherein said ultraviolet ray curable material is cleaved by an ultraviolet ray, and traps an electric charge present in an electrooptical modulating layer provided between said confronting substrates during the cleavage of said ultraviolet ray curable material.

20. The method of claim 19 wherein said cleaving step comprises projecting ultraviolet rays.

21. The method of claim 19 wherein said liquid crystal material contains a liquid crystal selected from the group consisting of twisted nematic liquid crystal and super twisted nematic liquid crystal.

22. A method for forming an electrooptical device comprising the steps of:

filling a mixture of a liquid crystal material and a non-cured resin to be cured by an ultraviolet ray and a heat in between a pair of confronting substrates having electrodes on inside surfaces thereof;

precipitating said resin from said mixture; and curing the precipitated resin by the ultraviolet ray and the heat, wherein said resin is cleaved by said curing step, and traps an electric charge present in an electrooptical modulating layer provided between said confronting substrates during the cleavage of said resin.

23. The method of claim 22 wherein said resin comprises an acrylic transformation epoxy resin.

24. The device of claim 22 wherein said resin comprises a reaction initiator.

* * * * *

UNITED STATES PATENT AND TRADEMARK OFFICE
CERTIFICATE OF CORRECTION

PATENT NO. : 5,682,218
DATED : October 28, 1997
INVENTOR(S) : Michio Shimizu et al.

It is certified that error appears in the above-indentified patent and that said Letters Patent is hereby corrected as shown below:

Column 35, line 47 through column 35 line 51 change claims 2 and 3 to read as follows:

The method of claim 6 wherein a reaction initiator is added by 0.001 to 10 weight % in said liquid crystal material.

The method of claim 6 wherein a reaction initiator comprises an ultraviolet ray exciting cleavage type material.

Signed and Sealed this

Twenty-eighth Day of July, 1998

*Attest:*

BRUCE LEHMAN

*Attesting Officer*  Commissioner of Patents and Trademarks